US011025907B2

(12) United States Patent
Li et al.

(10) Patent No.: US 11,025,907 B2
(45) Date of Patent: Jun. 1, 2021

(54) RECEPTIVE-FIELD-CONFORMING CONVOLUTION MODELS FOR VIDEO CODING

(71) Applicant: GOOGLE LLC, Mountain View, CA (US)

(72) Inventors: Shan Li, Fremont, CA (US); Claudionor Coelho, Redwood City, CA (US); Aki Kuusela, Palo Alto, CA (US); Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/289,149

(22) Filed: Feb. 28, 2019

(65) Prior Publication Data
US 2020/0280717 A1    Sep. 3, 2020

(51) Int. Cl.
*H04N 19/107*    (2014.01)
*H04N 19/119*    (2014.01)
(Continued)

(52) U.S. Cl.
CPC ............. *H04N 19/107* (2014.11); *G06N 3/04* (2013.01); *G06N 3/08* (2013.01); *H04N 19/119* (2014.11); *H04N 19/176* (2014.11); *H04N 19/96* (2014.11)

(58) Field of Classification Search
None
See application file for complete search history.

(56) References Cited

U.S. PATENT DOCUMENTS 5,568,414 A    10/1996  Murai
7,788,196 B2    8/2010  Buscema
(Continued)

FOREIGN PATENT DOCUMENTS

CN    105791826 A    7/2016
KR    20170059040 A    5/2017

OTHER PUBLICATIONS

Dertat ("Applied Deep Learning—Part 4: Convolutional Neural Networks", https://towardsdatascience.com/applied-deep-learning-part-4-convolutional-neural-networks-584bc134c1e2, Nov. 8, 2017.*
(Continued)

*Primary Examiner* — Mohammad J Rahman
(74) *Attorney, Agent, or Firm* — Young Basile Hanlon & MacFarlane, P.C.

(57) ABSTRACT

Convolutional neural networks (CNN) that determine a mode decision (e.g., block partitioning) for encoding a block include feature extraction layers and multiple classifiers. A non-overlapping convolution operation is performed at a feature extraction layer by setting a stride value equal to a kernel size. The block has a N×N size, and a smallest partition output for the block has a S×S size. Classification layers of each classifier receive feature maps having a feature dimension. An initial classification layer receives the feature maps as an output of a final feature extraction layer. Each classifier infers partition decisions for sub-blocks of size $(\alpha S) \times (\alpha S)$ of the block, wherein $\alpha$ is a power of 2 and $\alpha = 2, \ldots, N/S$, by applying, at some successive classification layers, a 1×1 kernel to reduce respective feature dimensions; and outputting by a last layer of the classification layers an output corresponding to a $N/(\alpha S) \times N/(\alpha S) \times 1$ output map.

20 Claims, 17 Drawing Sheets

(51) Int. Cl.
   H04N 19/176    (2014.01)
   H04N 19/96     (2014.01)
   G06N 3/04      (2006.01)
   G06N 3/08      (2006.01)

(56) References Cited

U.S. PATENT DOCUMENTS

| | | | | |
|---|---|---|---|---|
| 8,995,771 | B2* | 3/2015 | Zhang | G06K 9/6267 |
| | | | | 382/190 |
| 9,615,401 | B2* | 4/2017 | Geng | H04M 1/72525 |
| 9,807,416 | B2* | 10/2017 | Kuusela | H04N 19/196 |
| 10,489,703 | B2* | 11/2019 | Yang | G06K 9/4628 |
| 2002/0181771 | A1* | 12/2002 | Li | G06T 7/11 |
| | | | | 382/173 |
| 2002/0186874 | A1* | 12/2002 | Price | G06T 7/11 |
| | | | | 382/133 |
| 2006/0140401 | A1* | 6/2006 | Johnson | H04L 9/0625 |
| | | | | 380/44 |
| 2007/0076959 | A1* | 4/2007 | Bressan | H04N 19/14 |
| | | | | 382/224 |
| 2009/0010557 | A1* | 1/2009 | Zheng | H04N 19/197 |
| | | | | 382/239 |
| 2010/0002764 | A1* | 1/2010 | Lie | H04N 19/597 |
| | | | | 375/240.08 |
| 2012/0173527 | A1* | 7/2012 | Thiesson | G06F 16/35 |
| | | | | 707/737 |
| 2013/0128963 | A1 | 5/2013 | Leontaris et al. | |
| 2016/0065959 | A1 | 3/2016 | Stobaugh et al. | |
| 2017/0085915 | A1* | 3/2017 | Kuusela | H04N 19/59 |
| 2017/0140253 | A1* | 5/2017 | Wshah | G06N 3/08 |
| 2017/0231550 | A1* | 8/2017 | Do | G06K 9/3233 |
| | | | | 382/128 |
| 2017/0278289 | A1* | 9/2017 | Marino | G06K 9/00765 |
| 2018/0139450 | A1 | 5/2018 | Gao et al. | |
| 2018/0227585 | A1* | 8/2018 | Wang | H04N 19/119 |
| 2018/0253622 | A1* | 9/2018 | Chen | G06N 3/08 |
| 2018/0322606 | A1* | 11/2018 | Das | G06N 3/0454 |
| 2019/0035431 | A1* | 1/2019 | Attorre | H04N 21/23418 |
| 2019/0114511 | A1* | 4/2019 | Gao | G16B 20/00 |
| 2019/0138898 | A1* | 5/2019 | Song | G06N 3/0454 |
| 2019/0147332 | A1* | 5/2019 | Lagudu | G06F 1/3296 |
| 2019/0244394 | A1* | 8/2019 | Gueguen | H04N 19/186 |
| 2020/0042860 | A1* | 2/2020 | Sun | G06F 17/15 |
| 2020/0167929 | A1* | 5/2020 | Wang | G06T 7/194 |
| 2020/0213587 | A1* | 7/2020 | Galpin | G06N 3/08 |
| 2020/0244997 | A1* | 7/2020 | Galpin | H04N 19/82 |

OTHER PUBLICATIONS

Duanmu, Fanyi et al., "Fast CU Partition Decision Using Machine Learning for Screen Content Compression", New York University; 2015; 5 Pages.

He, Jing et al.; "Fast HEVC Coding Unit Decision Based on BP-Neutral Network" International Journal of Grid Distribution Computing vol. 8, No. 4, (2015), pp. 289-300.

T. Wiegand, H. Schwarz, A. Joch, F. Kossentini, G. J. Sullivan, "Rate-constrained coder control and comparison of video coding standards", IEEE Trans. Circuits Syst. Video Technol., v. 13, Jul. 2003.

Xu, M, et al, "Reducing Complexity of HEVC: A Deep Learning Approach", (<https://arxiv.org/abs/1710.01218>); Mar. 2018.

Zhang, Y, et al, "Machine Learning-Based Coding Unit Depth Decisions for Flexible Complexity Allocation in High Efficiency Video Coding", IEEE Transactions on Image Processing, vol. 24, No. 7; Jul. 201(<https://drive.google.com/open?id=1-csHxd6yrJ9K4GIFqXelKMFn3Dzyzeyw>).

Zhenyu, L, et al, "CU Partition Mode Decision for HEVC Hardwired Intra Encoder Using Convolution Neural Network", IEEE Transactions on Image Processing, vol. 25, No. 11, Nov. 2016 (<https://drive.google.com/open?id=1QIJG7xJiNkz81Dcw4a6qQTmLV6MRIEAH>).

Li, T, et al, "A deep convolutional neural network approach for complexity reduction on intra-mode HEVC," Proceedings of the IEEE International Conference on Multimedia and Expo (ICME) 2017, (<http://ieeexplore.ieee.org/stamp/stamp.jsp?tp=&arnumber=8019316>).

Springenberg, J. T., et al, "Striving for Simplicity: the all Convolutional Net," (<https://arxiv.org/pdf/1412.6806.pdf>).

Howard, Andrew G., et al.; "MobileNets: Efficient Convolutional Neural Networks for Mobile Vision Applications"; https://arxiv.org/abs/1704.04861; Apr. 17, 2017.

Galpin et al; "AHG9: CNN-Based Driving of Block Partitioning for Intra Slices Encoding"; JVET Meeting; Apr. 3, 2018; http://phenix.int-evry.fr/jvet; pp. 1, 3.

Liu Zhenyu et al; "CU Partition Mode Decision for HEVC Hardwired Intra Encoder Using Convolution Neural Netword" IEEE Transactions on Image Processing IEEE Service Center, vol. 25, No. 11; Nov. 1, 2016; pp. 5088-5103.

Zhang Yun et al; Machine Learning-Based Coding Unit Depth Decisions for Flexible Complexity Allocation in High Efficiency Video Coding: IEEE Transactions on Image Processing, IEEE Service Center, vol. 24, No. 7; Jul. 1, 2015; pp. 2230-2231.

Perez et al; "Genetic Selection of Non-Linear Product Terms in the Inputs to a Linear Classifier for Handwritten Digit Recognition"; IEEE International Conference on Systems, Man and Cybernetics; vol. 4; Oct. 7, 2001; p. 2339.

International Search Report and Written Opinion of International Application No. PCT/US2019/051453; dated Dec. 4, 2019; 15 pages.

Duanmu et al; "Fast CU Partition Decision Using Machine Learning for Screen Content Compression"; IEEE International Conference on Image Processing; 2015; pp. 1-5.

He et al.; "Fast HEVC Coding Unit Decision Based on BP-Neural Network"; International Journal of Grid Distribution Computing vol. 8, No. 4, (2015), pp. 289-300.

Wiegand, et al, "Rate-constrained coder control and comparison of video coding standards", IEEE Trans. Circuits Syst. Video Technol., v. 13, Jul. 2003.

Xu, M, et al, "Reducing Complexity of HEVC: A Deep Learning Approach", 2017;<https://arxiv.org/abs/1710.01218>.

Dumoulin et al., "A guide to convolution arithmetic for deep learning", 2016.<https://arxiv.org/abs/1603.07285>.

Dang Ha The Hien, "A guide to receptive field arithmetic for Convolutional Neural Networks", 2017. <https://medium.com/mlreview/a-guide-to-receptive-field-arithmetic-for-convolutional-neural-networks-e0f514068807>.

Springenberg et al., "Striving for simplicity: the all convolutional net", ICLR, 2015.

Redmon et al., "You Only Look Once: Unified, Real-Time Object Detection" 2016. <https://arxiv.org/pdf/1506.02640.pdf>.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet—Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

(56) References Cited

OTHER PUBLICATIONS

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Mai Xu et al: "Reducing Complexity of HEVC: A Deep Learning Approach", IEEE Transactions on Image Processing., vol. 27, No. 10, Mar. 22, 2018 (Mar. 22, 2018), pp. 5044-5059, XP055647622, US ISSN: 1057-7149, DOI: 10.1109/TIP. 2018.2847035 (Year: 2018).

International Search Report and Written Opinion of International Application No. PCT/US2019/051458; dated Dec. 13, 2019; 15 pages.

Meng Xiandong et al: Filter Based on Multi-channel Long-Short-Term Dependency Residual Networks 2018 Data' Compression Conference, IEEE, Mar. 27, 2018, pp. 187-196.

Feng Zeqi et al: Based CTU Depth Range Prediction, 2018 IEEE 3rd International Conference on Image, Vision and Computing (ICIVC), IEEE, Jun. 27, 2018, pp. 551-555.

\* cited by examiner

RECEPTIVE-FIELD-CONFORMING CONVOLUTION MODELS FOR VIDEO CODING

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Over the years, the coding efficiency of video encoders has improved. Coding efficiency can mean encoding a video at the lowest possible bit rate while minimizing distortion (i.e., while maintaining a certain level of video quality). However, the improved coding efficiency has resulted in increased computational complexity. That is, more computation time is required by an encoder to achieve the improved coding efficiency. As such, it is desirable to obtain improved coding efficiencies with less computation time (i.e., reduced computational complexity).

SUMMARY

One aspect of the disclosed implementations is a convolutional neural network (CNN) for determining a mode decision for encoding a block in video coding. The CNN includes feature extraction layers for extracting features of the block for determining the mode decision. A non-overlapping convolution operation is performed on input at at least one of the feature extraction layers by setting a stride value equal to a kernel size, the mode decision comprises a block partitioning of the block, the block has a N×N size, and a smallest partition output for the block has a S×S size. The CNN also includes multiple classifiers. Each classifier comprises classification layers, each classification layer of the classification layers receiving respective feature maps having a respective feature dimension. Each classifier is configured to infer partition decisions for sub-blocks of size $(\alpha S) \times (\alpha S)$ of the block, wherein $\alpha$ is a power of 2 and $\alpha = 2, \ldots, N/S$, by applying, at some of successive classification layers of the classification layers, a kernel of size 1×1 to reduce the respective feature dimension, and outputting by a final layer of the classification layers an output corresponding to a $N/(\alpha S) \times N/(\alpha S) \times 1$ output map. An initial classification layer of each classifier can receive the feature maps as an output of a final feature extraction layer of the feature extraction layers. The output map can indicate one or more mode decisions for the block. For example, the output map can indicate a partition decision. The output map may be used to encode the block.

Another aspect is a method of determining a mode decision for encoding a block in video coding using a convolutional neural network (CNN). The method includes extracting, using feature extraction layers of the CNN, features of the block for determining the mode decision, wherein a non-overlapping convolution operation is performed on input at at least one of the feature extraction layers by setting a stride value equal to a kernel size, the mode decision comprises a block partitioning of the block, the block has a N×N size, and a smallest partition output for the block has a S×S size. The method also includes inferring, by multiple classifiers of the CNN that each include classification layers, the mode decision. Inferring the mode decision includes receiving, by each classification layer, respective feature maps having a respective feature dimension, and inferring, by a respective classifier of the multiple classifiers, partition decisions for sub-blocks of size $(\alpha S) \times (\alpha S)$ of the block, wherein $\alpha$ is a power of 2 and $\alpha = 2, \ldots, N/S$. Inferring the mode decisions includes applying, at some of successive classification layers of the classification layers, a kernel of size 1×1 to reduce the respective feature dimension in half, and outputting by a last layer of the classification layers an output corresponding to a $N/(\alpha S) \times N/(\alpha S) \times 1$ output map. An initial classification layer of each classifier may receive the feature maps as an output of a final feature extraction layer of the feature extraction layers. The mode decision, as indicated by the output, may be used to encode the block.

Another aspect is an apparatus for decoding an image block. The apparatus includes a processor configured to execute a method including receiving, in a compressed bitstream, an indication of a partitioning of the image block into sub-blocks. An encoder determined the partitioning of the image block using a convolutional neural network (CNN) that includes feature extraction layers for extracting features of the block for determining the partitioning, wherein a non-overlapping convolution operation is performed on input at at least one of the feature extraction layers by setting a stride value equal to a kernel size, the block has a N×N size, and a smallest partition output for the block has a S×S size. The CNN also includes multiple classifiers, wherein each classifier comprises classification layers, each classification layer of the classification layers receiving respective feature maps having a respective feature dimension. Each classifier is configured to infer partition decisions for sub-blocks of size $(\alpha S) \times (\alpha S)$ of the block, wherein $\alpha$ is a power of 2 and $\alpha = 2, \ldots, N/S$, by applying, at some of successive classification layers of the classification layers, a kernel of size 1×1 to reduce the respective feature dimension, and outputting by a last layer of the classification layers an output corresponding to a $N/(\alpha S) \times N/(\alpha S) \times 1$ output map. An initial classification layer of each classifier can receive the feature maps as an output of a final feature extraction layer of the feature extraction layers. The method also includes decoding the image block using the indication of the partitioning of the image block.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
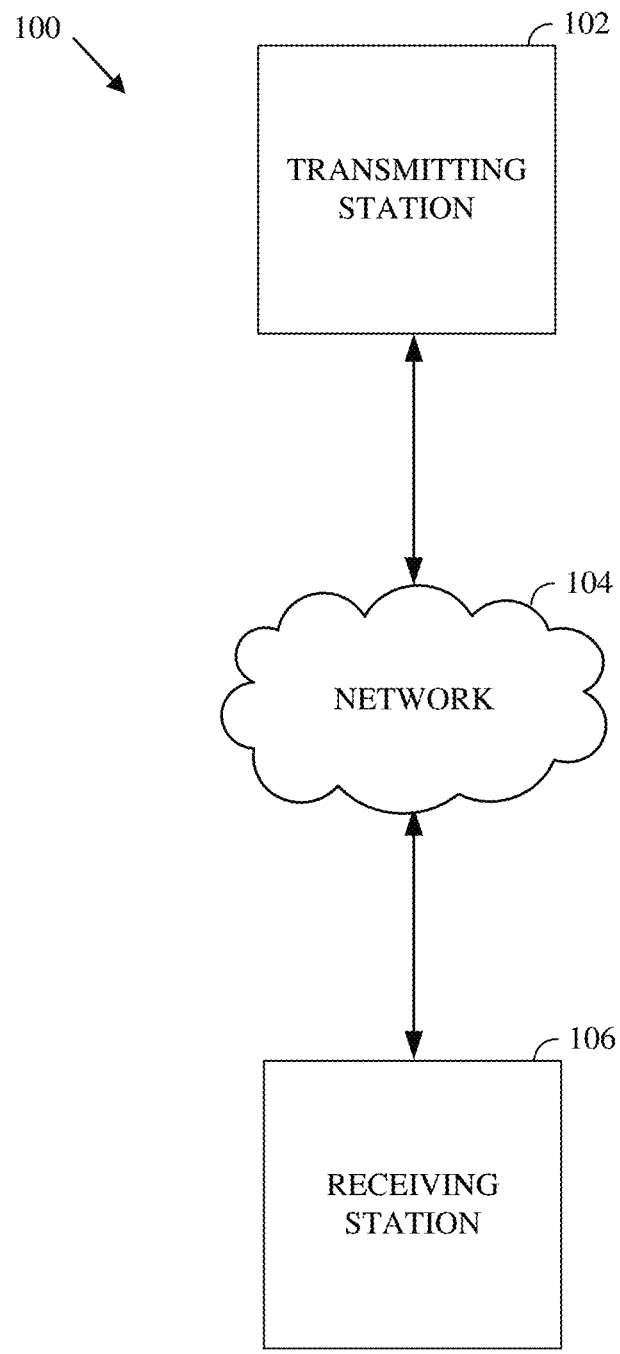
FIG. 1 is a schematic of a video encoding and decoding system.

Encoding techniques may be designed to maximize coding efficiency. Coding efficiency can mean encoding a video at the lowest possible bit rate while minimizing distortion (e.g., while maintaining a certain level of video quality). Coding efficiency is typically measured in terms of both rate and distortion. Rate refers to the number of bits required for encoding (such as encoding a block, a frame, etc.). Distortion measures the quality loss between, for example, a source video block and a reconstructed version of the source video block. For example, the distortion may be calculated as a mean-square error between pixel values of the source block and those of the reconstructed block. By performing a rate-distortion optimization process, a video codec optimizes the amount of distortion against the rate required to encode the video.

Modern video codecs (e.g., H.264, which is also known as MPEG-4 AVC; VP9; H.265, which is also known as HEVC; AVS2; and AV1) define and use a large number of tools and configurations (e.g., parameters) to improve coding efficiency. A video encoder can use a mode decision to examine (e.g., test, evaluate, etc.) at least some of the valid combinations of parameters to select a combination that results in a relatively low rate-distortion value. An example of a mode decision is an intra-prediction mode decision, which determines the best intra-prediction mode for coding a block. Another example of a mode decision is a partition decision, which determines an optimal partitioning of a coding unit (also known as a coding unit or CU). Another example of a mode decision includes a decision as to a transform type and/or size to use in transforming a block (such as a residual or an image block) from the pixel domain to the frequency domain to form a transform block that includes transform coefficients.

To evaluate whether one combination is better than another, a metric can be computed for each of the examined combinations and the respective metrics compared. In an example, the metric can combine the rate and distortion described above to produce a rate-distortion (RD) value or cost. The RD value or cost may be a single scalar value.

As mentioned, a best mode can be selected from many possible combinations. For example, the RD cost associated with a specific mode (or a specific combination of tools) may be determined by performing at least a subset of the encoding steps of the encoder. The subset of the encoding steps can include, depending on the mode for which a RD cost is to be determined, at least one of determining a prediction block, determining a residual block, determining a transform type, determining an interpolation filter, quantizing a transform block, entropy encoding, and so on. Note that these encoding steps are neither intended to be an exhaustive list of encoding steps that a typical encoder may perform nor presented in any particular order (that is, an encoder does not necessarily perform these steps, as listed, sequentially). As the number of possible tools and parameters increases, the number of combinations also increases, which, in turn, increases the time required to determine the best mode.

Instead of an exhaustive search, an encoder may terminate a mode search as soon as it finds a mode with a RD cost that is less than a set threshold. This means, however, that a better mode may have been found later on if the encoder had continued in mode search. In some cases, an exhaustive search may or may not be performed, but the entire RD cost calculation is replaced by a coarse estimation. This can further degrade decision making by an encoder.

Techniques such as machine learning may be exploited to reduce the time required to determine a best mode, such as a partition mode. For example, instead of performing all of the encoding steps (i.e., a brute-force or exhaustive approach) for determining the rate and distortion for various partitioning modes to compare those modes and select a best mode, a machine-learning model can be used to estimate or infer the best mode.

The machine-learning model may be trained using the vast amount of training data that is available from an encoder performing standard encoding techniques, such as those described below. More specifically, the training data can be used during the learning phase of machine learning to derive (e.g., learn, infer, etc.) the machine-learning model that is (e.g., defines, constitutes, etc.) a mapping from the input data (e.g., block data) to an output.

Once a machine-learning model is trained, the model computes the output as a deterministic function of its input. In an example, the machine-learning model can be a neural network model, which can be implemented by a convolutional neural network (CNN). A well-trained machine-learning model can be expected to closely match the brute-force approach in coding efficiency but at a significantly lower computational cost or with a regular or dataflow-oriented computational cost.

In addition to using appropriate training data and inputs to the machine-learning model, the architecture of the machine-learning model can also be critical to the performance and/or prediction capability of the model. The models described herein comprise convolution layers of a CNN with filter designs that respect boundaries for recursive partitioning. That is, when analyzing an image region, such as for determining a quad-tree partitioning, the features extracted (e.g., calculated, inferred, etc.) for the image region are confined to the image region itself, and not for other image regions. Further, the models described herein allow the models to have a small size (i.e., those with a reduced number of parameters as compared to models using fully connected layers). The inference accuracy for mode decision in video encoding can be significantly improved while reducing the computational complexity.

Further details of the inventive CNN architectures according to the teachings herein will be discussed below first with reference to a block-based codec with the teachings may be incorporated. Although a block-based codec is described as an example, other codecs may be used with the present teachings, including a feature-based codec.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
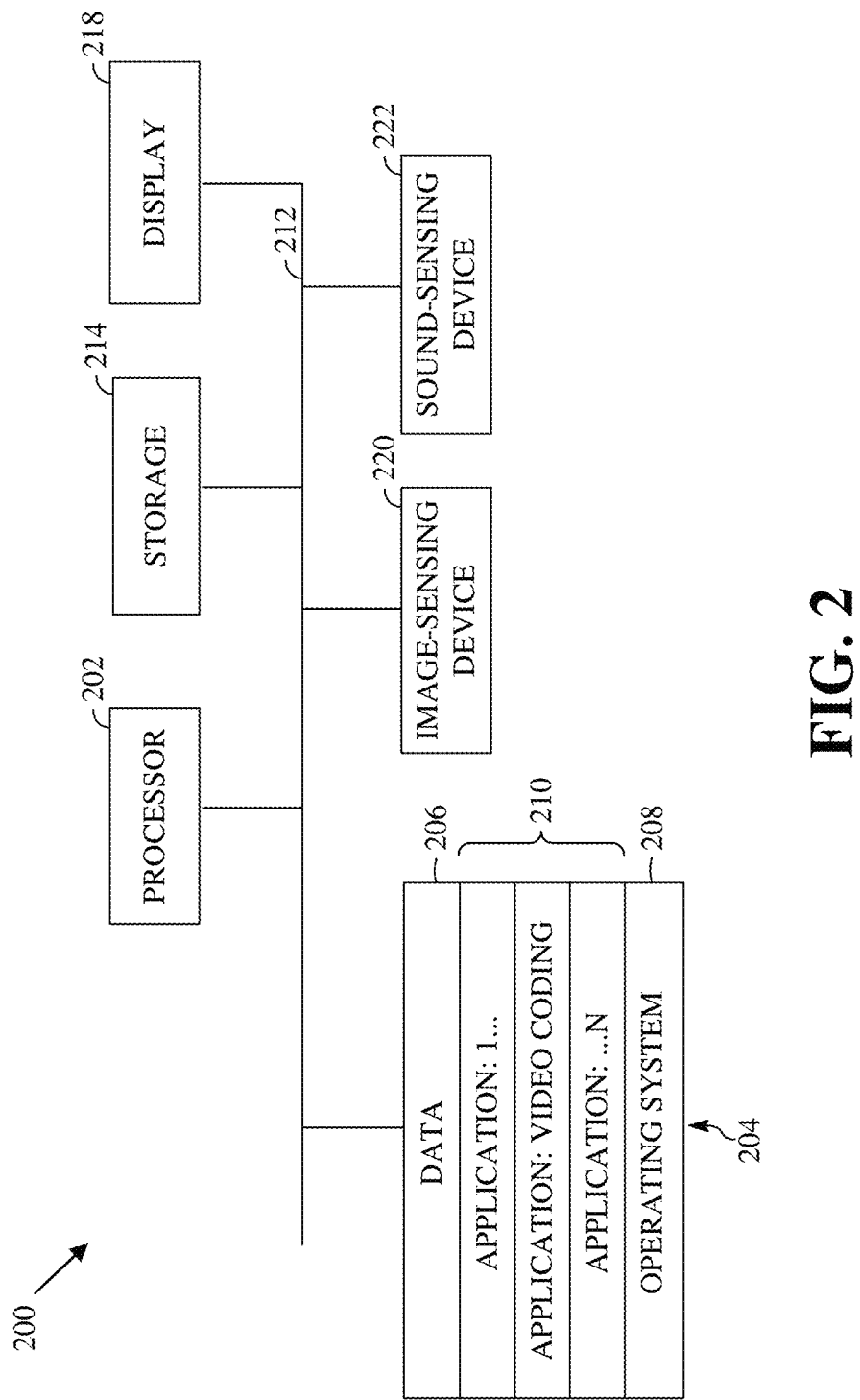
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP (e.g., an HTTP-based video streaming protocol) may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
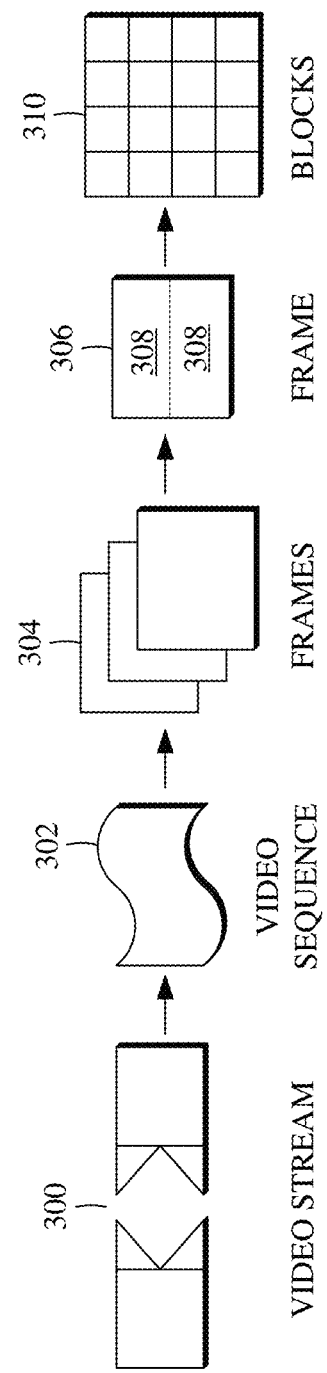
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance (or luma) plane and two chrominance (or chroma) planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger. For example, and as described below with regards to FIG. 6, a block may comprise luma pixels from the luma plane, or chroma pixels from the chroma plane.

Figure 4:
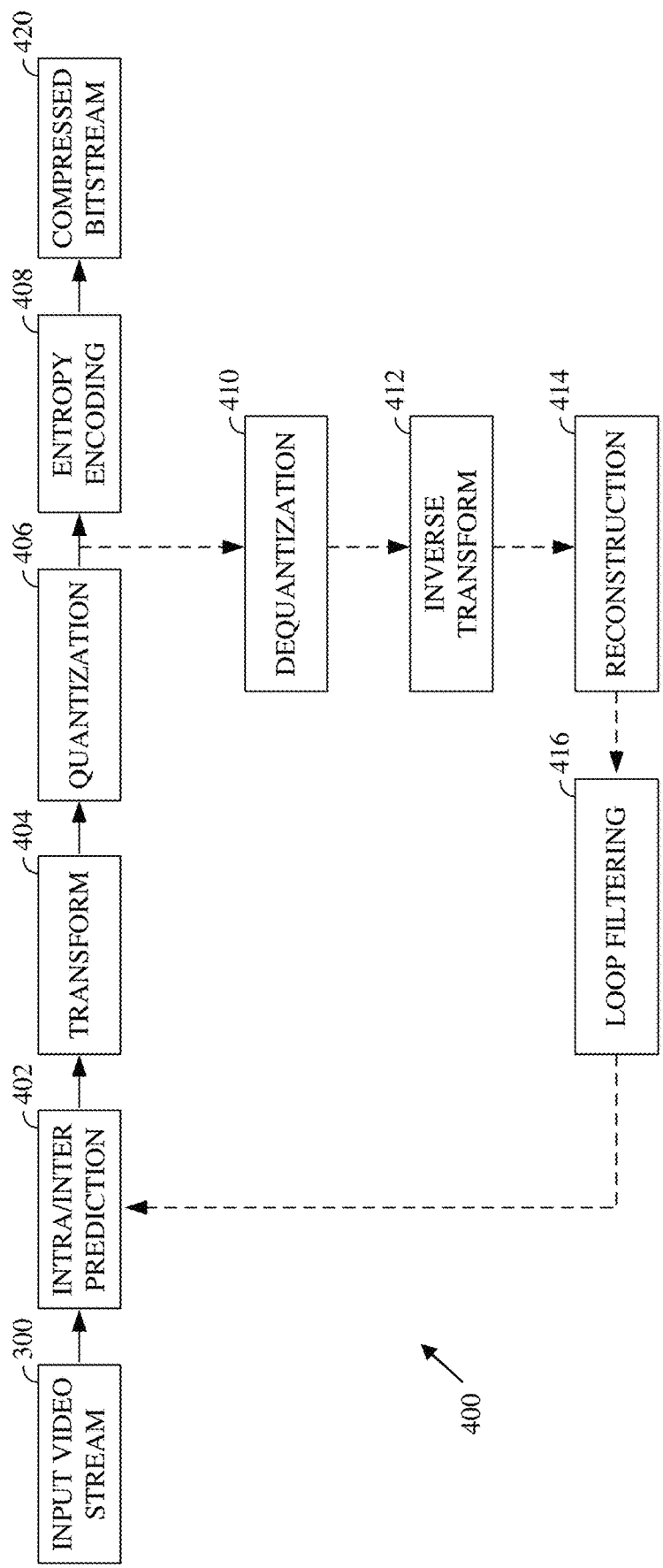
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
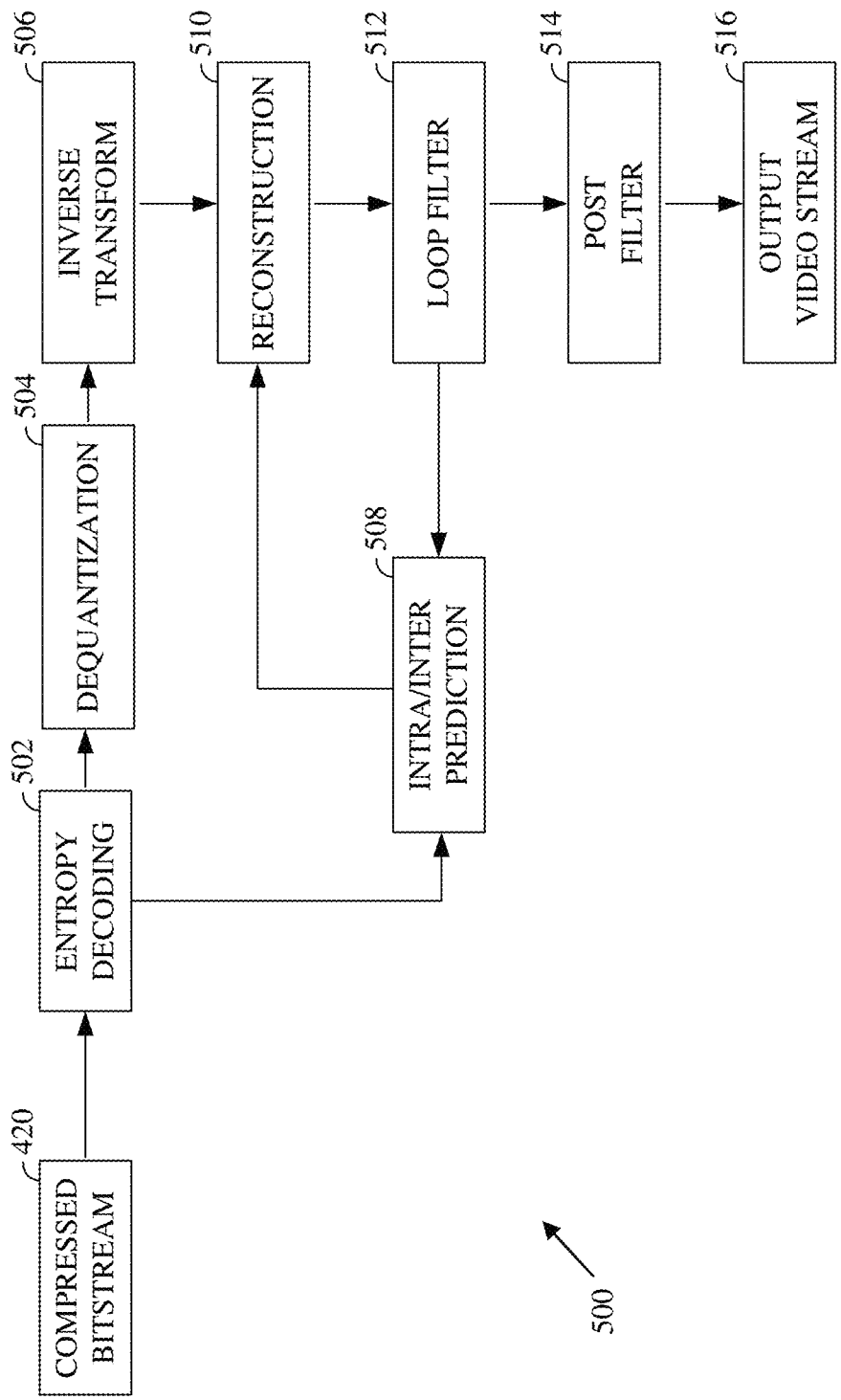
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Figure 6:
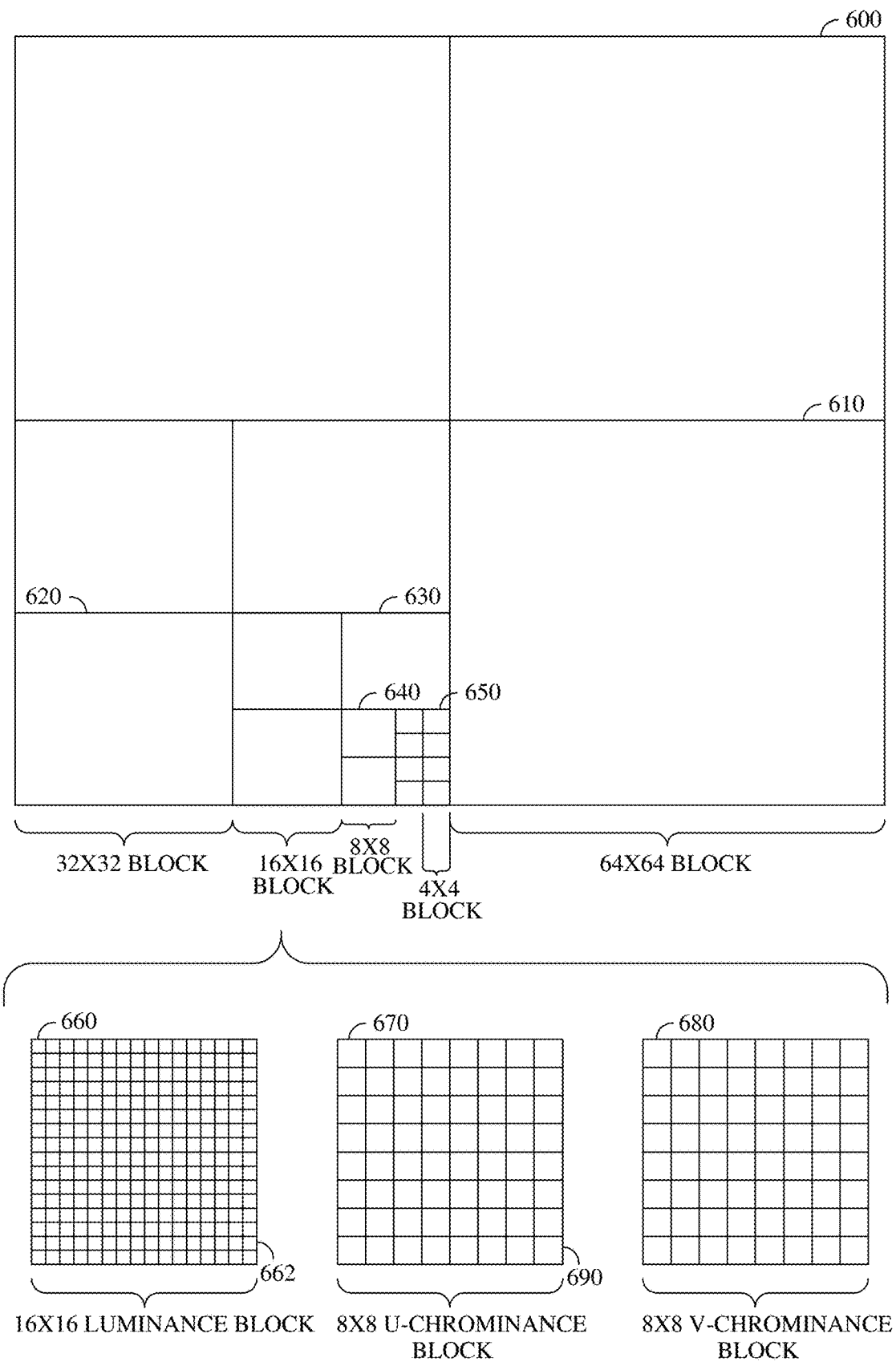
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

Figure 7:
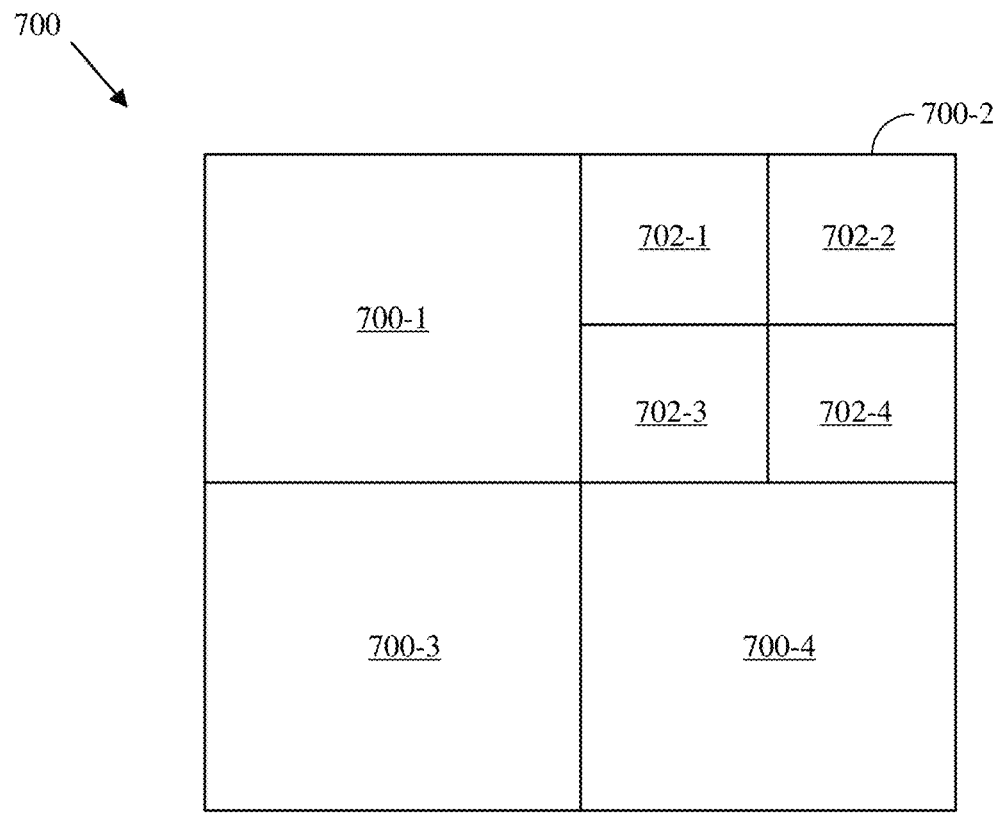
FIG. 7 is a block diagram of an example of a quad-tree representation of a block according to implementations of this disclosure.
Figure 7:
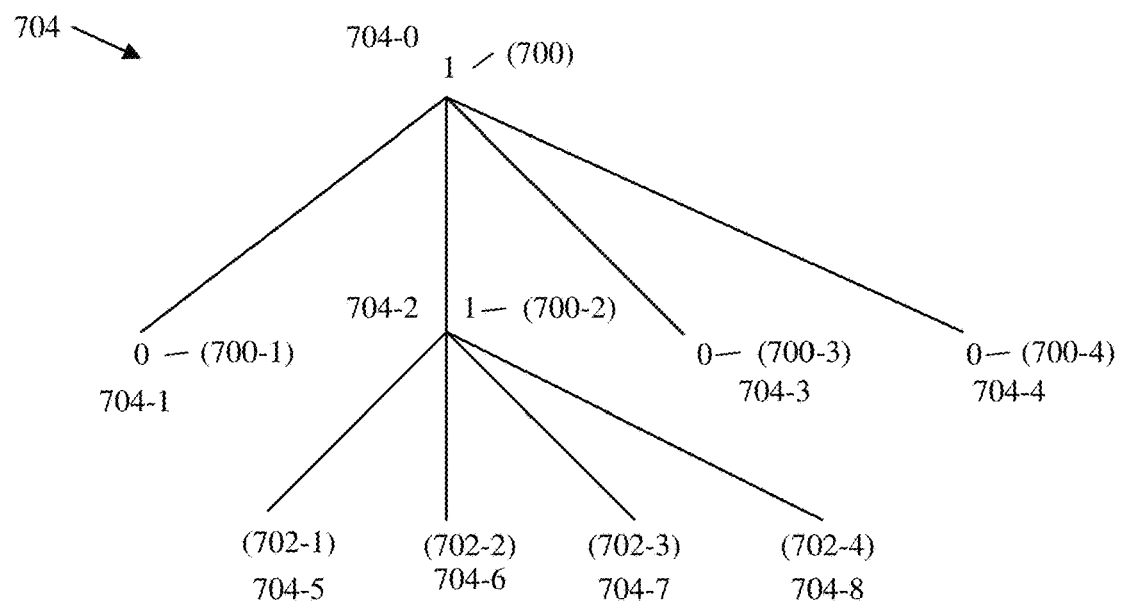

Although other partitions are possible, as described above in regards to FIG. 6, a CU or block may be coded using quad-tree partitioning or coding as shown in the example of FIG. 7. The example shows quad-tree partitioning of a block 700. However, the block 700 can be partitioned differently, such as by an encoder (e.g., the encoder 400 of FIG. 4) or a machine-learning model as described below.

The block 700 is partitioned into four blocks, namely, the blocks 700-1, 700-2, 700-3, and 700-4. The block 700-2 is further partitioned into the blocks 702-1, 702-2, 702-3, and 702-4. As such, if, for example, the size of the block 700 is N×N (e.g., 128×128), then the blocks 700-1, 700-2, 700-3, and 700-4 are each of size N/2×N/2 (e.g., 64×64), and the blocks 702-1, 702-2, 702-3, and 702-4 are each of size N/4×N/4 (e.g., 32×32). If a block is partitioned, it is partitioned into four equally sized, non-overlapping square sub-blocks.

A quad-tree data representation is used to describe how the block 700 is partitioned into sub-blocks, such as blocks 700-1, 700-2, 700-3, 700-4, 702-1, 702-2, 702-3, and 702-4. A quadtree 704 of the partition of the block 700 is shown. Each node of the quadtree 704 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quadtree, a node either has four child nodes or has no child nodes. A node that has no child nodes corresponds to a block that is not split further. Each of the child nodes of a split block corresponds to a sub-block.

In the quadtree 704, each node corresponds to a sub-block of the block 700. The corresponding sub-block is shown between parentheses. For example, a node 704-1, which has a value of 0, corresponds to the block 700-1.

A root node 704-0 corresponds to the block 700. As the block 700 is split into four sub-blocks, the value of the root node 704-0 is the split bit (e.g., 1). At an intermediate level, the flags indicate whether a sub-block of the block 700 is further split into four sub-sub-blocks. In this case, a node 704-2 includes a flag of "1" because the block 700-2 is split into the blocks 702-1, 702-2, 702-3, and 702-4. Each of nodes 704-1, 704-3, and 704-4 includes a flag of "0" because the corresponding blocks are not split. As nodes 704-5, 704-6, 704-7, and 704-8 are at a bottom level of the quadtree, no flag of "0" or "1" is necessary for these nodes. That the blocks 702-5, 702-6, 702-7, and 702-8 are not split further can be inferred from the absence of additional flags corresponding to these blocks. In this example, the smallest sub-block is 32×32 pixels, but further partitioning is possible.

The quad-tree data for the quadtree 704 can be represented by the binary data of "10100," where each bit represents a node of the quadtree 704. The binary data indicates the partitioning of the block 700 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quadtree 704 can be used as the bases for prediction. That is, prediction can be performed for each of the blocks 700-1, 702-1, 702-2, 702-3, 702-4, 700-3, and 700-4, referred to herein as coding blocks. As mentioned with respect to FIG. 6, the coding block can be a luminance block or a chrominance block. It is noted that, in an example, the block partitioning can be determined with respect to luminance blocks. The same partition, or a different partition, can be used with the chrominance blocks.

A prediction type (e.g., intra- or inter-prediction) is determined at the coding block. That is, a coding block is the decision point for prediction.

A mode decision process (e.g., partition decision process) determines the partitioning of a coding block, such as the block 700. The partition decision process calculates the RD costs of different combinations of coding parameters. That is, for example, different combinations of prediction blocks and predictions (e.g., intra-prediction, inter-prediction, etc.) are examined to determine an optimal partitioning.

As a person skilled in the art recognizes, many mode decision processes can be performed by an encoder.

Figure 8:
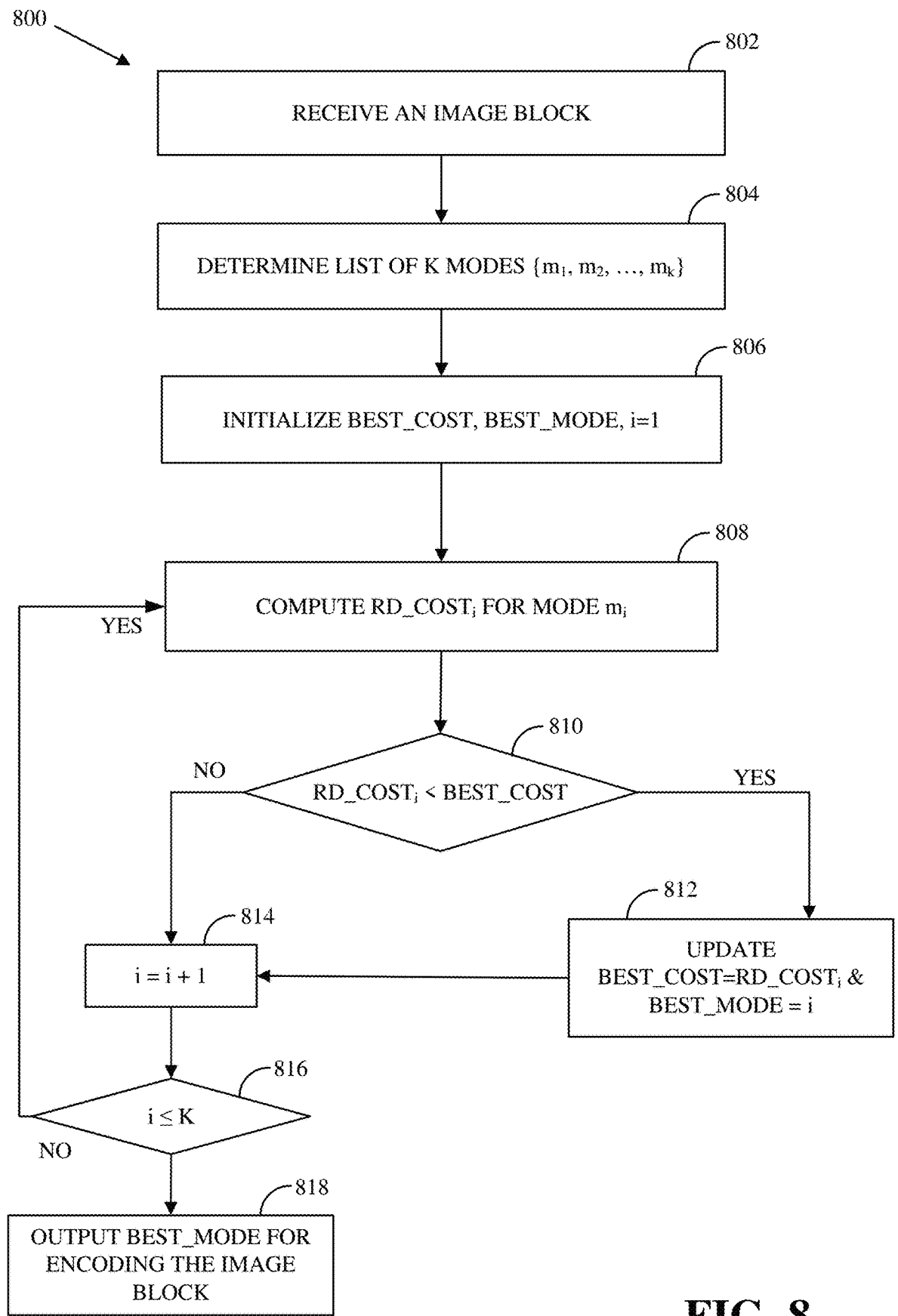
FIG. 8 is a flowchart of a process for searching for a best mode to code a block.

FIG. 8 is a flowchart of a process 800 for searching for a best mode to code a block. The process 800 is an illustrative, high level process of a mode decision process that determines a best mode. For ease of description, the process 800 is described with respect to selecting an intra-prediction mode for encoding a prediction block. Other examples of best modes that can be determined by processes similar to the process 800 include determining a transform type and determining a transform size. The process 800 can be implemented by an encoder, such as the encoder 400 of FIG. 4, using a brute-force approach to mode decision.

At 802, the process 800 receives an image block. As the process 800 is described with respect to determining an intra-prediction mode, the image block can be a prediction unit. As described with respect to FIG. 7, each of the leaf node coding blocks (e.g., a block 700-1, 702-1, 702-2, 702-3, 702-4, 700-3, or 700-4) can be partitioned into one or more prediction units until a smallest prediction unit/block size is reached such that further partitioning is not possible. The image block can be one such prediction unit.

At 804, the process 800 determines (e.g., selects, calculates, chooses, etc.) a list of modes. The list of modes can include K modes, where K is an integer number. The list of modes can be denoted $\{m_1, m_2, \ldots, m_k\}$. The encoder can have available a list of intra-prediction modes. For example, the list of available intra-prediction modes can be {DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, PAETH_PRED}. A description of these intra-prediction modes is omitted as the description is not pertinent to the understanding of this disclosure. The list of modes determined at 804 can be any subset of the list of available intra-prediction modes.

At 806, the process 800 initializes a BEST_COST variable to a high value (e.g., INT_MAX, which may be equal to 2,147,483,647) and initializes a loop variable i to 1, which corresponds to the first mode to be examined.

At 808, the process 800 computes (e.g., calculates) an $RD\_COST_i$ for the $mode_i$. At 810, the process 800 tests whether the RD cost, $RD\_COST_i$, of the current mode under examination, $mode_i$, is less than the current best cost, BEST_COST. If the test at 810 is positive, then at 812, the process 800 updates the best cost to be the cost of the current mode (i.e., BEST_COST=$RD\_COST_i$) and sets the current best mode index (BEST_MODE) to the loop variable i (BEST_MODE=i). The process 800 then proceeds to 814 to increment the loop variable i (i.e., i=i+1) to prepare for examining the next mode (if any). If the test at 810 is negative, then the process 800 proceeds to 814.

At 816, if there are more modes to examine (i.e., if i≤K), the process 800 proceeds back to 808; otherwise the process 800 proceeds to 818. At 818, the process 800 outputs the index of the best mode, BEST_MODE. Outputting the best mode can mean returning the best mode to a caller of the process 800. Outputting the best mode can mean encoding the image using the best mode. Outputting the best mode can have other semantics. The process 800 terminates after outputting the best mode at 818.

FIG. 8 illustrates that a brute-force approach to mode decision is largely a serial process that essentially codes an image block X by using candidate modes to determine the mode with the best cost. Machine learning can be used to reduce the computational complexity in mode decisions.

At a high level, and without loss of generality, a machine-learning model, such as a classification deep-learning model, includes two main portions: a feature-extraction portion and a classification portion. The feature-extraction portion detects features of the model. The classification portion attempts to classify the detected features into a desired response. Each of the portions can include one or more layers and/or one or more operations.

As mentioned above, a CNN is an example of a machine-learning model. In a CNN, the feature extraction portion can include a set of convolutional operations, which is typically a series of filters that are used to filter an input image based on a filter (e.g., a square of size k). For example, and in the context of machine vision, these filters can be used to find features in an input image. The features can include, for example, edges, corners, endpoints, and so on. As the number of stacked convolutional operations increases, later convolutional operations can find higher-level features.

In a CNN, the classification portion may be a set of fully connected layers. The fully connected layers can be thought of as looking at all the input features of an image in order to generate a high-level classifier. Several stages (e.g., a series) of high-level classifiers eventually generate the desired classification output.

As can be discerned from this description, a CNN network is often composed of a number of convolutional operations (e.g., the convolution layers of the feature-extraction portion) followed by a number of fully connected layers (also called Dense layers) forming the classification portion. The number of operations of each type and their respective sizes are typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the layers of the classification portion). A convolution operation can use a SeparableConvolution2D or Convolution2D operation. For example, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolution layer, Dense layer, or the output of the CNN is reached.

Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

Each of the convolution layers may consist of a set of filters. While a filter is applied to a subset of the input data at a time, the filter is applied across the full input, such as by sweeping over the input. The operations performed by this layer may be linear/matrix multiplications. An example of a convolution filter is described below. The output of the convolution filter may be further filtered using an activation function. The activation function may be a linear function or non-linear function (e.g., a sigmoid function, an arcTan function, a tan H function, a ReLu function, or the like).

Each of the fully connected operations is a linear operation in which every input is connected to every output by a weight. As such, a fully connected layer with N number of inputs and M outputs can have a total of N×M weights. A Dense operation may be generally followed by a non-linear activation function to generate an output of that layer.

Some CNN network architectures may include several feature extraction portions that extract features at different granularities (e.g., at different sub-block sizes of a superblock) and a flattening layer (which may be referred to as a concatenation layer) that receives the output(s) of the last convolution layer of each of the extraction portions. The flattening layer aggregates all the features extracted by the different feature extractions portions into one input set. The output of the flattening layer may be fed into (i.e., used as input to) the fully connected layers of the classification portion. As such, the number of parameters of the entire network may be dominated (e.g., defined, set) by the number of parameters at the interface between the feature extraction portion (i.e., the convolution layers) and the classification portion (i.e., the fully connected layers). That is, the number of parameters of the network is dominated by the parameters of the flattening layer. This is one disadvantage of the above-described architectures.

Other disadvantages of the CNN architectures described above, which include a flattening layer whose output is fed into fully connected layers, exist. First, models with fully connected layers tend to have a large number of parameters and operations. In some situations, the machine-learning model may include over 1 million parameters. Such large models may not be effectively or efficiently used, if at all, to infer classifications on devices (e.g., mobile devices) that may be constrained (e.g., computationally constrained, energy constrained, and/or memory constrained). That is, some devices may not have sufficient computational capabilities (for example, in terms of speed) or memory storage (e.g., RAM) to handle (e.g., execute) such large models.

Second, the fully connected layers of such network architectures are said to have a global view of all the features that are extracted by the feature extraction portions. As such, the fully connected layers may, for example, lose a correlation between a feature and the location of the feature in the input image. As such, receptive fields of the convolution operations can become mixed by the fully connected layers. A receptive field can be defined as the region in the input space that a particular feature is looking at and/or is affected by. An example of a receptive field is described below. Presently, however, the problem wherein the receptive fields become mixed may be illustrated briefly in regards to FIG. 7

Namely, when a CNN as described above (e.g., a CNN that includes a flattening layer and fully connected layers) may be used to determine a partition of a block 700 of FIG. 7. The CNN may extract features corresponding to different regions and/or sub-block sizes of the block 700. As such, for example, features extracted from blocks 700-1, 700-2, 700-3, and 700-4 of the block 700 are flattened into one input vector to the fully connected layers. In inferring whether to partition the sub-block 700-2 into blocks 702-1, 702-2, 702-3, and 702-4, by the fully connected layers, features of at least one of the blocks 700-1, 700-3, and 700-4 may be used by the fully connected layers. As such, features of sub-blocks (e.g., the blocks 700-1, 700-3, and 700-4), which are unrelated to the sub-block 700-2 for which a partition decision is to be inferred, may be used in the inference. This may lead to erroneous inferences and/or inferences that are based on irrelevant information.

In contrast, the CNN architectures according to the present teachings herein analyze frames and blocks of frames in a way that the receptive field of a cascade of convolutional layers respect quad-tree boundaries. That is, when analyzing an image region, such as for determining a quad-tree partitioning, the receptive fields of any features extracted (e.g., calculated, inferred, etc.) for the image region are confined to the image region itself. This may be achieved by using an all-convolution network, and carefully designing the filter sizes of the convolutional operations to yield a matrix representation of the analysis region, whether a 64×64 region, a 32×32 region, or a 16×16 region, for example. Implementations according to this disclosure can ensure that machine-learning models (generated during training and used during inference) for determining, e.g., block partitioning, are not erroneously based on irrelevant or extraneous features, such as pixels from outside the image region.

Figure 9:
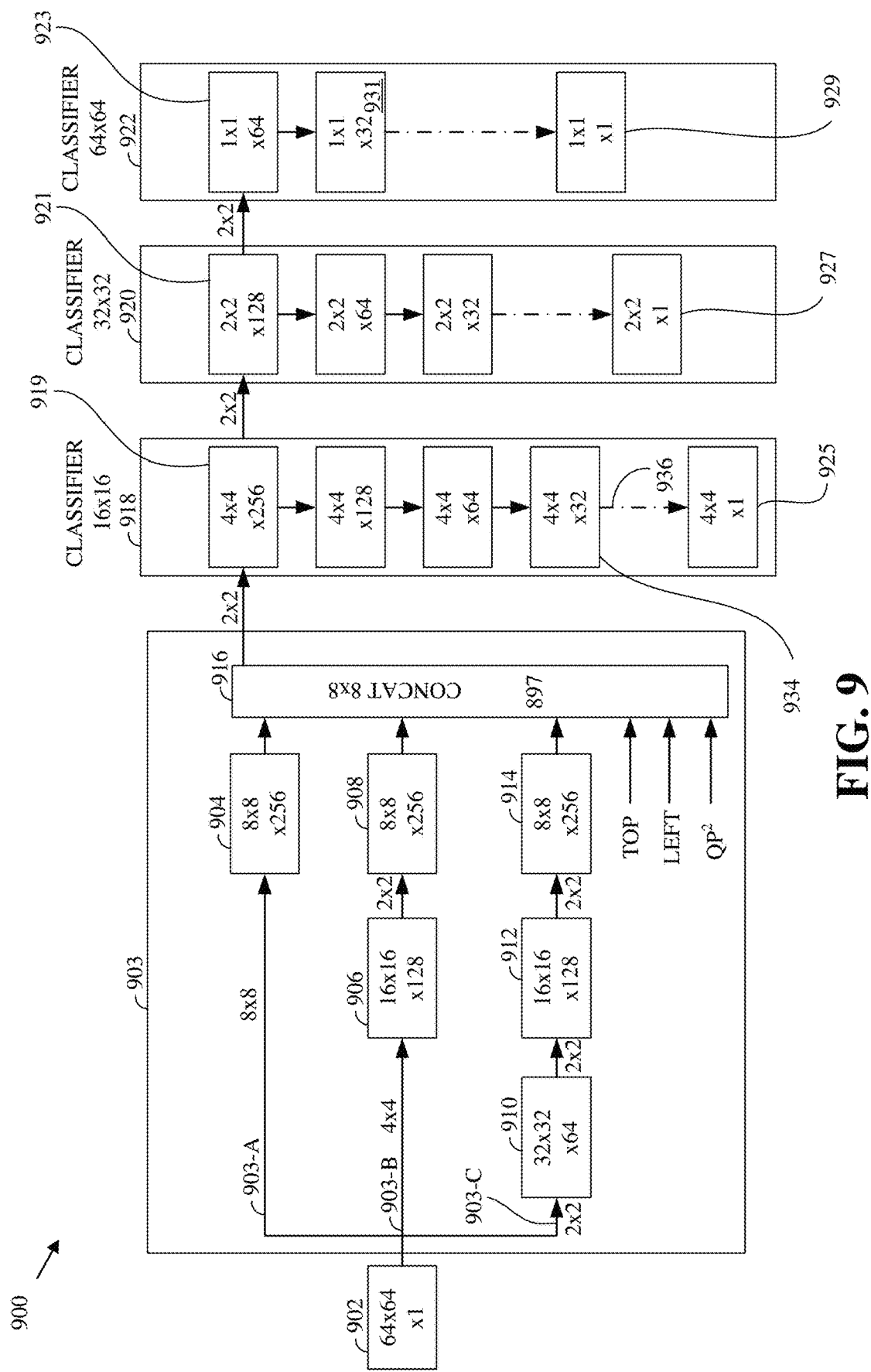
FIG. 9 is a block diagram of a first example of a convolutional neural network (CNN) for a mode decision according to implementations of this disclosure.

One example of such a receptive-field-conforming convolution model for video coding is shown in FIG. 9. Specifically, FIG. 9 is a block diagram of an example of a convolutional neural network (CNN) 900 for a mode decision according to implementations of this disclosure. The CNN 900 can be used for determining a block partition of an image block. The block can be a superblock. For example, the CNN 900 can be used to determine the block size used in the intra/inter-prediction stage 402 of FIG. 4. The partition can be a quad-tree partition, such as described with respect to FIG. 7. The CNN 900 can be used to determine a partition for an intra-coded block or an inter-coded block of a frame, such as the frame 304 of FIG. 3. The CNN 900 can be used by an encoder where the smallest possible block partition is an 8×8 partition. As such, determinations of whether to split a block need be made for blocks (i.e., sub-blocks of the superblock) that are 16×16 or larger.

As further described below, the number of parallel branches of the feature extraction portion of the CNN 900 can be parameterizable (e.g., configurable). For example, in a configuration, only one branch (e.g., a linear branch) can be used. This is possible as long as the receptive field conformance property, as further described below, is maintained. Except for the top and left rows of the block, the receptive field conformance property means that the receptive field boundary of the block does not cross the boundaries of the block.

A block 902 (i.e., an image block) to be encoded is presented to the CNN 900. The block 902 can be a one color-plane block. As such, the block 902 can be a luminance block. That the block is a one color-plane block is illustrated by the "×1" in "64×64×1" in FIG. 9. As mentioned, the block 902 can be a superblock. While a superblock of size 64×64 is shown and used to describe the CNN 900, the block 902 can be of any size. For example, the block 902 can be 128×128, 32×32, or any size block for which a, e.g., quad-tree, partitioning has been determined by an encoder, such as an encoder 400 of FIG. 4. In another example, and since prediction modes can depend on adjacent (i.e., peripheral) pixels to a block that is to be partitioned, the block 902 (i.e., the block that is used as input to the CNN 900) can include pixels that are outside of the block for which a partitioning is to be determined. For example, if a partitioning of a 64×64 block is to be determined, then a block of size 65×65×1 can be used as input to the CNN 900. That is, for example, the left and top neighboring pixels of the block for which a partitioning is to be determined can be included in the input block to the CNN 900. An example of such as configuration is described below.

One or more feature extraction layers 903 form three branches as shown; namely a branch 903-A, a branch 903-B, and a branch 903-C. The number of branches in the feature extraction layer can be configurable to include more or fewer branches. Each of the branches can include one or more layers. At each layer, respective feature maps is extracted. In the description below, features maps, such as feature maps 904, is referred to as having a dimension of A×B×C. For example, the feature maps 904 is of size 8×8×256. This is to be interpreted as follows: the feature maps 904 includes 256 feature maps and each of the 256 feature maps is of size 8×8 pixels (or features). In other words, the feature maps 904 can be thought of as a set of 256 matrices where each matrix is of size 8×8. In one configuration of the CNN 900, the feature extraction of each partition type can be separated, instead of sharing the feature extraction as in FIG. 9. Architectures using such a configuration are described in more detail below.

The number of features at a feature map can be configurable. For example, while the feature maps 904 is shown to be 8×8×256, it can be 8×8×N, where N is any desired number of features. Other sizes are possible in different implementations, such as those described with respect to FIG. 12, below. In some examples, a feature compression rate can be applied to a machine-learning model to expand or reduce the number of features in the model. For example, the feature compression rate can be multiplied by all feature maps for feature expansion (or reduction).

Figure 10:
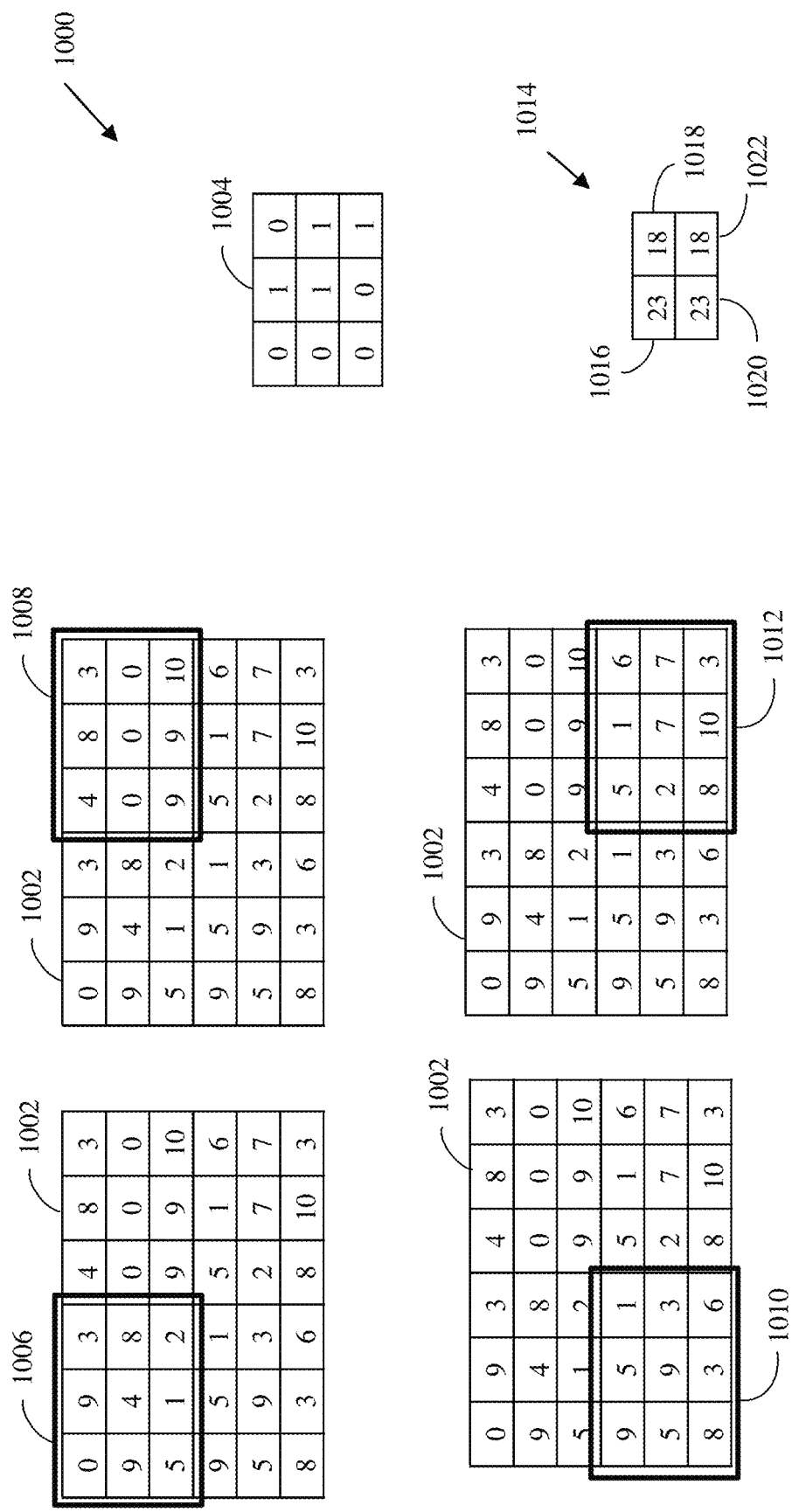
FIG. 10 is an example of convolution operations according to implementations of this disclosure.

The branch 903-A extracts, in a first layer of the branch 903-A, features corresponding to 8×8 blocks of the block 902. The branch 903-A convolves, with the block 902, 256 filters (also referred to as kernels). FIG. 10 is an example 1000 of convolution operations according to implementations of this disclosure. The convolution operations can be used to generate any of the feature maps described herein.

The example 1000 includes a region 1002 of an image. The region 1002 is shown as a 6×6 region for the purposes of this example. However, it is to be understood that convolution filters can be applied to any size block, superblock, region of image, or an image.

A filter 1004 of size 3×3 is used in this example. However, filters can have different sizes. The example 1000 uses a non-overlapping convolution operation with a stride that is equal to the filter size. As such, the stride size, in each of the horizontal and vertical directions is 3. The filter 1004 is shown as including binary (i.e., zero and one) values. However, the values of a filter can be any value (e.g., positive and/or negative real values). As mentioned above, the values of a filter can be determined, by the machine-learning model, during the training phase of the machine-learning model. Feature map 1014 is the output of convolving the region 1002 and the filter 1004.

The filter 1004 is first convolved (e.g., using a matrix multiplication operation) with a sub-region 1006. As a result, a pixel 1016 of the feature map 1014 can be calculated as (0×0+9×1+3×0+9×0+4×1+8×1+5×0+1×0+2×1)=23. The filter 1004 is then convolved with a sub-region 1008. As a result, a pixel 1018 can be calculated as (4×0+8×1+3×0+0×0+0×1+0×1+9×0+9×0+10×1)=18. The filter 1004 is then convolved with a sub-region 1010. As a result, a pixel 1020 can be calculated as (9×0+5×1+1×0+5×0+9×1+3×1+8×0+3×0+6×1)=23. The filter 1004 is then convolved with a sub-region 1012. As a result, a pixel 1022 can be calculated as (5×0+1×1+6×0+2×0+7×1+7×1+8×0+10×0+3×1)=18.

Referring again to FIG. 9, the branch 903-A convolves, with the block 902, 256 filters, each having a size 8×8. A stride that is equal to the size of the filters (i.e., a stride that is equal to 8) is used. As a result, 256 feature maps (i.e., the feature maps 904), each of size 8×8, are extracted. A filter of size 8×8 is defined by a kernel of the same size where each entry in the kernel can be a real number. In an example, the entries can be non-negative integers that are greater than 1. Filtering an 8×8 block may thus be achieved by computing the inner product between the block and a filter kernel of the same size. In machine learning, filter kernels (i.e., the real numbers which constitute the values of the kernels) can be learned in the training process.

The branch 903-B extracts 256 feature maps (i.e., feature maps 908), each of size 8×8. The branch 903-B first extracts, at a first layer of the branch 903-B, feature maps 906 by convolving the block 902 with 128 filters, each of size 4×4, and using a stride of 4 (i.e., a stride that is equal to the filter size). At a second layer of the branch 903-B, each of the 128 feature maps of the feature maps 906 is convolved with two 2×2 filters, using a stride of 2, thereby resulting in the feature maps 908.

The branch 903-C extracts 256 feature maps (i.e., feature maps 914), each of size 8×8. The branch 903-C first extracts, at a first layer of the branch 903-C, feature maps 910 by convolving the block 902 with 64 filters, each of size 2×2, and using a stride of 2. At a second layer of the branch 903-B, each of the 64 feature maps of the feature maps 910 is convolved with two 2×2 filters, using a stride of 2, thereby resulting in 128 feature maps (i.e., feature maps 912). At a third layer of the branch 903-C, each of the 128 features maps of the feature maps 912 is convolved with two 2×2 filters, using a stride of 2, thereby resulting in the feature maps 914.

It is to be noted that, each time a filter is applied to a unit (e.g., the region 1002 or a feature map), the unit is down-sized (i.e., down-sampled), in each dimension, by the size of the filter.

The feature maps 910 are feature maps of the 32×32 blocks of the block 902. The feature maps 906 are feature maps of the 16×16 blocks of the block 902. The feature maps 904 are feature maps of the 8×8 blocks of the block 902. The feature maps 908 normalizes the feature maps 906 to be, like the feature maps 904, of size 8×8. Likewise, the feature maps 912 followed by the feature maps 914 normalize the feature maps 910 to be, similarly, of size 8×8.

In an example, the feature maps can be normalized, via successive convolutions, to be feature maps of the smallest possible partition that can be used by the encoder. As such, the size 8×8 corresponding to the smallest possible partition type that can be used by the encoder when the CNN 900 of FIG. 9 is used. Similarly, if the smallest possible partition were 4×4, then the feature extraction layers 903 can normalize the feature maps to be of size 4×4. In an example, the feature extraction layers 903 can include an additional branch and each of the branches would generate, via successive convolutions, feature maps that are each of size 4×4. In another example, the feature maps can be normalized to a size that does not necessarily correspond to the smallest partition size. For example, the features maps can be normalized to any size that is larger than or equal 8×8.

A concatenation layer 916 receives the feature maps 904, 908, and 914. Additionally, when the CNN 900 is used to determine (e.g., infer, provide, etc.) a partition for the block 902 that is to be intra-predicted, at least some samples of the neighboring blocks can also be used as input to the concatenation layer 916. This is because intra-prediction uses at least some samples (i.e., pixels) of neighboring blocks. While samples from the top neighboring block (indicated with TOP in FIG. 9) and samples from the left neighboring block (indicated with LEFT in FIG. 9) are shown for illustrative purposes, other neighboring blocks may be used, depending on the scan order used to process blocks of a video frame. For example, LEFT and TOP are used in the case of a raster scan order. In an implementation, all the samples of the top and left neighboring blocks are used as inputs to the concatenation layer 916. However, and as mentioned above, samples of the top and left neighboring blocks can be included in the input block (e.g., the block 902 of FIG. 9). Additionally, in a CNN that is used to determine other mode decision parameters (e.g., an inter-prediction parameter or transform parameter), samples from neighboring blocks may or may not be used as inputs to the CNN.

In an implementation, and as a person skilled in the art appreciates, TOP can be a row of previously reconstructed pixels that are peripheral to the top edge of the block 902; and LEFT can be a column of previously reconstructed pixels that are peripheral to the left edge of the block 902. There can be up to 64 samples corresponding to TOP and up to 64 samples corresponding to LEFT. As mentioned above, TOP and LEFT can be added, instead or in addition, to the input block that is presented to the CNN.

A non-linear function of a quantization parameter (QP, q, or Q) may optionally be used as an input to the CNN. A QP in video codecs can be used to control the tradeoff between rate and distortion. Usually, a larger QP means higher quantization (e.g., of transform coefficients) resulting in a lower rate but higher distortion; and a smaller QP means lower quantization resulting in a higher rate but a lower distortion.

The value of the QP can be fixed. For example, an encoder can use one QP value to encode all frames and/or all blocks of a video. In other examples, the QP can change, for example, from frame to frame. For example, in the case of a video conference application, the encoder can change the QP value based on fluctuations in network bandwidth.

As the QP can be used to control the tradeoff between rate and distortion, the QP can be used to calculate the RD cost associated with each combination of parameters in an exhaustive search as described above with regard to FIG. 8. In an example, the QP can be used to derive a multiplier that is used to combine the rate and distortion values into one metric. Some codecs may refer to the multiplier as the Lagrange multiplier (denoted $\lambda_{mode}$); other codecs may use a similar multiplier that is referred as rdmult. Each codec may have a different method of calculating the multiplier. Unless the context makes clear, the multiplier is referred to herein, regardless of the codec, as the Lagrange multiplier or Lagrange parameter.

To reiterate, the Lagrange multiplier can be used to evaluate the RD costs of competing modes (i.e., competing combinations of parameters). Specifically, let $r_m$ denote the rate (in bits) resulting from using a mode m and let $d_m$ denote the resulting distortion. The RD cost of selecting the mode m can be computed as a scalar value $d_m + \lambda_{mode} r_m$. By using the Lagrange parameter $\lambda_{mode}$, it is then possible to compare the cost of two modes and select one with the lower combined RD cost. This technique of evaluating RD cost is a basis of mode decision processes in at least some video codecs.

Different video codecs may use different techniques to compute the Lagrange multipliers from the QPs. This is due in part to the fact that the different codecs may have different meanings (e.g., definitions, semantics, etc.) for, and method of use of, QPs. For example, codecs that implement the H.264 standard may derive the Lagrange multiplier $\lambda_{mode}$ according to $\lambda_{mode} = 0.85 \times 2^{(QP-12)/3}$. Codecs that implement the HEVC standard may use a formula that is similar. Codecs that implement the H.263 standard may derive the Lagrange multiplier $\lambda_{mode}$ according to $\lambda_{mode} = 0.85 \cdot Q_{H263}^2$: Codecs that implement the VP9 standard may derive the multiplier rdmult according to rdmult=$88 \cdot q^2 / 24$. Codecs that implement the AV1 standard may derive the Lagrange multiplier $\lambda_{mode}$ according to $\lambda_{mode} = 0.12 \cdot Q_{AV1}^2 / 256$.

As can be seen in the above cases, the multiplier has a non-linear (e.g., exponential or quadratic) relationship to the QP. Note that the multipliers may undergo further changes before being used in the respective codecs to account for additional side information included in a compressed bitstream by the encoder. Examples of side information include picture type (e.g., intra vs. inter predicted frame), color components (e.g., luminance or chrominance), and/or region of interest. In an example, such additional changes can be linear changes to the multipliers.

Given the above, if the value of the QP itself is used as an input to a machine-learning model, a disconnect may result between how the QP is used in evaluating the RD cost and how the QP is used in training machine-learning models. For codecs that use QP in the determination of RD cost, better performance can be achieved by using non-linear (e.g., exponential, quadratic, etc.) forms of the QPs as input to machine-learning models as compared to using linear (e.g., scalar) forms of the QPs. Better performance can mean smaller network size and/or better inference performance. In an example, the non-linear function can be approximated by piecewise linear segments.

As mentioned, QP may be used as an input to the CNN. In the example of FIG. 9, QP is used as an input to the concatenation layer 916. More specifically, a quadratic function (i.e., QP$^2$) is illustrated in FIG. 9. As described above, however, the function used depends on the codec; more specifically, the function used depends on the standard implemented by the codec. For example, a quadratic function may be used in the case of a codec that implements H.263, VP9, or AV1; and an exponential function may be used in the case of a codec that implements H.264 or HEVC.

A total of 897 inputs can be received by the concatenation layer 916. The inputs include 256 inputs of the feature maps 904, 256 inputs of the feature maps 908, 256 inputs feature maps 914, 64 inputs at TOP, 64 inputs at LEFT, and the non-linear value of QP (such as QP$^2$. In some implementations, a sample (i.e., a pixel) that is adjacent to the top-left corner of the block 902 can also be used as an input to the concatenation layer 916. In such a case, the concatenation layer 916 receives 898 inputs.

The CNN 900 includes three classifiers, namely classifiers 918, 920, and 922. Each of the classifiers 918, 920, 922 includes a set of classification layers and uses convolutions as further described below.

The classifier 918 infers (i.e., outputs) partition decisions for sub-blocks of size 16×16 of the block 902. It is noted that the block 902 can be partitioned into 16 blocks (comprising 4×4 outputs), each block of size 16×16. As such, the classifier 918 reduces, to a size of 4×4, the feature maps (which are each of size 8×8) received from the concatenation layer 916.

First, feature maps 919 are obtained from the feature maps received from the concatenation layer 916 by applying non-overlapping convolutions using 2×2 separable convolution filters to combine some of the feature maps into one, thereby resulting in 256 feature maps, each of size 4×4.

Secondly, a series of 1×1 convolutions are applied, successively, to gradually reduce the feature dimension size to 1. As such, 1×1×128 convolutions (where the number of filters is 128) are applied to the feature maps 919, resulting in 4×4×128 feature maps, to which 1×1×64 convolutions (where the number of filters is 64) are applied, resulting in 4×4×64 feature maps, to which 1×1×32 convolutions are applied resulting in 4×4×32 feature maps, to which a 1×1×1 convolution is applied resulting in a 4×4×1 feature map, namely the feature map 925.

For each 16×16 sub-block of the block 902, the classifier 918 infers whether to split or not split the sub-block. As such, the classifier 918 outputs 16 decisions corresponding, respectively, to each of the 16×16 sub-blocks of the block 902. The 16 decisions can be binary decisions. That is, the feature map 925 can be thought of as a matrix of binary decisions. For example, a zero (0) can correspond to a decision not to split a sub-block and a one (1) can correspond to a decision to split the sub-block. The order of the output of the classifier 918 can correspond to a raster scan order of the 16×16 sub-blocks of the block 902. In another example, the decisions can correspond to probabilities (i.e., values that range from 0 to 1), or some other values, such as values that range from 0 to 100. When a decision is greater than a threshold that is appropriate for the range of the decision values (e.g., 0.9, 0.75%, 90, etc.), it can be considered to correspond to a binary decision of 1.

The classifier 920 infers (i.e., outputs) partition decisions for sub-blocks of size 32×32 of the block 902. The classifier 920 receives the feature maps 919 and convolves each of the feature maps with 2×2 separable convolution filters to combine feature maps of the feature maps 919 into one, thereby resulting in feature maps 921. It is noted that the block 902 can be partitioned into 2×2 blocks, each of size 32×32. As such, the classifier 920 reduces, to the size of 2×2, the feature maps 919 (which are each of size 4×4) through a series of non-overlapping convolutions using 1×1 filters to gradually reduce the feature dimension size to 1, as described above with respect to the feature maps 919, thereby resulting in a feature map 927. For each 32×32 sub-block of the block 902, the classifier 920 infers whether to split or not split the sub-block. As such, the classifier 920 outputs 4 decisions corresponding, respectively, to each of the 32×32 sub-blocks of the block 902.

The classifier 922 infers (i.e., outputs) partition decisions for the block 902 itself. The classifier 922 receives the feature maps 921 and convolves each of the feature maps with a 2×2 separable convolution filter resulting in feature maps 923, which combines some of the feature maps of the features maps 921 into 1. It is noted that the block 902 can be partitioned into only one 1×1 block of size 64×64. As such, the classifier 922 reduces, to the size of 1×1, the feature maps 923 (which are each of size 1×1) through a series of non-overlapping convolutions using 1×1 filters to gradually reduce the feature dimension size to 1, as described above with respect to the feature maps 919, thereby resulting in a feature map 929. For the block 902, the classifier 922 infers whether to split or not split the block 902. As such, the classifier 922 outputs one decision corresponding to whether to split or not split the block 902 into four 32×32 sub-blocks.

Separable convolution filters of size 2×2 are described to obtain the feature maps 919, 921, and 923 (of the classifiers 918, 920, and 922, respectively) in order to ultimately determine, for a block of size 64×64, 4×4 16×16 partitions (i.e., the feature map 925), 2×2 32×32 partitions (i.e., the feature map 927), and 1×1 64×64 partition (i.e., the feature map 929), respectively. However, in the general case, any convolutional filters of size $2^k$ can be used as long the classifiers 918, 920, and 922 determine, as described, 4×4 16×16 partitions (i.e., the feature map 925), 2×2 32×32 partitions (i.e., the feature map 927), and 1×1 64×64 partition (i.e., the feature map 929).

In the classifier 918, the feature map 925, which has a dimension of 4×4×1, is shown as being directly derived (i.e., there are no additional intervening convolution operations) from a feature maps 934, which is of size 4×4×32. However, that need not be the case and any number of additional convolution operations can be used between the feature maps 934 and the feature map 925. This is illustrated by a dot-dashed line 936. The same can be applicable to the classifiers 920 and 922 with respect to the feature map 927 and the feature map 929, respectively.

In an example, a parameter can be used as a configuration parameter (i.e., a threshold parameter) of the CNN. If the number of remaining features is less than or equal to the threshold parameter, then the number of features of the next layer can be set to 1. In the example of the CNN 900 of FIG. 9, the threshold parameter is set to 32. Because the number of features of the feature maps 934 is equal to the threshold parameter (i.e., 32), then the next layer corresponds to the layer that produces the feature map 925, which has a feature dimension of 1. In an example, each of the classifiers can be configured with a different respective threshold parameter. In another example, all the classifiers can be configured to use the same threshold parameter.

In an example, the feature map dimensionality (i.e., the last dimension of a feature maps) within a classifier can be reduced using a feature reduction parameter F. For example, a classifier can reduce the number of channels according to the progression IncomingFeature, IncomingFeature/F, IncomingFeature/$F^2$, ..., 1, where IncomingFeature is the number of features that are initially received by the layer. In an example, each of the classifiers can be configured with a different respective feature reduction parameter. In another example, all the classifiers can be configured to use the same feature reduction parameter.

The classifier 918 is now used to illustrate the threshold parameter and the feature reduction parameter. With respect to the classifier 918, IncomingFeature is 256 (as illustrated by the features maps 919, which is of size 4×4×256), the feature reduction parameter F is 2, and the threshold parameter is 32. As such, the classifier 918 reduces the number of channels according to the progression 256, 256/2, $256/2^2$, $256/2^3$, and 1. That is, the classifier 918 reduces the number of channels according to the progression 256, 128, 64, 32, and 1. The classifier 918 does not include a layer where the number of channels is $256/2^4$ (i.e., 16) because the threshold parameter 32 for the number of channels is reached at the progression $256/2^3$ (i.e., 32).

The CNN 900 can be extended to infer partition decisions for other block sizes. For example, an encoder may allow the smallest partition to be of size 4×4. As such, to infer partition decisions for sub-blocks of size 8×8, a branch can be added to the feature extraction layers 903 such that each branch of the feature extraction layers 903 can generate feature maps, each of size 4×4, as inputs to the concatenation layer 916. Additionally, a classifier can be added between the concatenation layer 916 and the classifier 918. The added classifier infers (i.e., outputs) partition decisions for sub-blocks of size 8×8 of the block 902. It is noted that the block 902 can be partitioned into 8×8 sub-blocks, each of size 8×8. The added classifier reduces, to a size of 8×8×1, the feature maps received from the concatenation layer 916 through a series of non-overlapping convolutions using 2×2 filters in this example.

The CNN 900 can be configured to infer partition decisions of a 128×128 block. For the 128×128 block, a CNN can be configured to include classifiers that determine, respectively, one (i.e., a 1×1 output matrix) 128×128 decision (i.e., one decision corresponding to whether the block is or is not to be split), four (i.e., a 2×2 output matrix) 64×64 decisions, 16 (i.e., a 4×4 output matrix) 32×32 decisions, and 64 (i.e., a 8×8 output matrix) 16×16 decisions.

In some implementations, the CNN 900 can include early termination features. For example, if the classifier 922 infers that the block 902 is not to be split, then processing through the classifiers 920 and 918 need not be continued. Similarly, if the classifier 920 infers that none of the 32×32 sub-blocks of the block 902 are to be split, then processing through the classifier 920 need not be continued.

Figure 11:
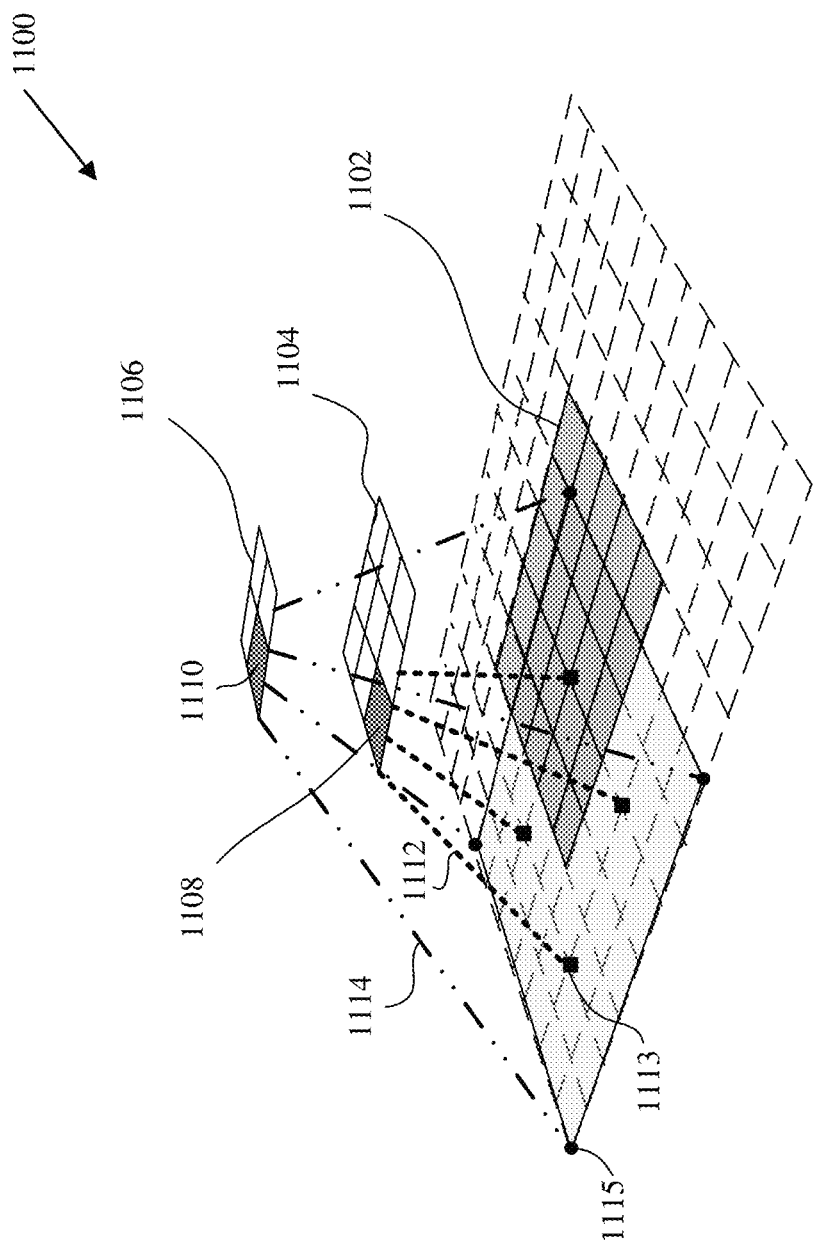
FIG. 11 is an example of receptive fields according to implementations of this disclosure.

The CNN 900 is one example of an all convolution architecture that is receptive field conformant. Receptive field conformance may be further explained with reference to FIG. 11. FIG. 11 is an example 1100 of receptive fields according to implementations of this disclosure. The example 1100 includes an input 1102. The example 1100 and the explanation herein are adapted from Dang Ha The Hien, "A guide to receptive field arithmetic for Convolutional Neural Networks," April 2017, [retrieved on Aug. 6, 2018]. Retrieved from the Internet <URL: https://medium.com/mlreview/a-guide-to-receptive-field-arithmetic-for-convolutional-neural-networks-e0f514068807>.

The input 1102 can be a portion of an image for which it is desirable to extract features (e.g., a feature map). The input 1102 can be, for example, the block 700, one of the blocks 700-1, 700-2, 700-3, and 700-4, or one of the block 702-1, 702-2, 702-3, and 702-4. The input 1102 is shown as having a size of 5×5 pixels. However, the size of the input 1102 is not pertinent to the description of the concept of a receptive field.

The example 1100 illustrates convolution operations that use filters/kernels of size k=3×3 (also referred to as a kernel size of 3), a padding size p=1×1, and a stride s=2×2 (also referred to as a stride value of 2). An example of a filter of size k=3×3 with a stride value of 3 is illustrated with respect to the filter 1004 of FIG. 10. Padding defines how the border of a sample is handled during a convolution. Further descriptions of the concepts of padding, stride, and kernel (i.e., filter) size are omitted herein as such concepts are well-known to a person skilled in the art.

The example 1100 illustrates a first feature map 1104 that is the result of convolving the input 1102 with a first filter and a second feature map 1106 that is the result of convolving the first feature map with a second filter. The first filter and the second filter can have different values. In machine learning, the values of the filters can be determined (e.g., learned) during the training phase.

A pixel 1108 (which may also be referred to as a feature) of the first feature map 1104 results from the convolution of pixels of the input 1102. Such pixels are the receptive field of the pixel 1108. Note that because the convolution uses padding, some of the pixels (e.g., the padding pixels) used for generating the pixel 1108 are outside of the input. The receptive field of the pixel 1108 is defined by a square whose corners are marked by black squares, such as a black square 1113. Dashed lines, such as a dashed line 1112, emanating from the corners of the pixel 1108 also illustrate the receptive field of the pixel 1108. The end points of the dashed lines are the black squares.

A pixel 1110 (which may also be referred to as a feature) of the second feature map 1106 results from the convolution of pixels of the first feature map 1104. Such pixels are the receptive field of the pixel 1110 in the first feature map 1104 and can be further projected onto the input 1102 to determine receptive field in the input 1102. Note that because the convolution uses padding, some of the pixels (e.g., the padding pixels) used for generating the pixel 1110 are outside of the first feature map 1104. The padding pixels of the first feature map 1104 are not shown so as to not clutter FIG. 11. The receptive field of the pixel 1110 in the input 1102 is defined by a square whose corners are marked by black circles, such as a black circle 1115. Dot-dashed lines, such as a dot-dashed line 1114, emanating from the corners of the pixel 1110 also illustrate the receptive field in the input 1102 of the pixel 1110. The end points of the dot-dashed lines are the black circles.

The receptive field can play an important role in image analysis during video encoding. The receptive field of a series of convolution layers can be interpreted as the "region" of the image (e.g., a block, a superblock, a frame, or any other portion of an image) that each pixel (e.g., a feature) "sees" (e.g., influenced by, summarizes, etc.) when computing the pixel. Pixels at the initial input layer (e.g., the input 1102) become features (via a series of convolutions) for later layers (e.g., the second layer, which includes the second feature map 1106) of a CNN that will aid the CNN to analyze the initial input layer.

When using a CNN to analyze a model for determining a mode decision (e.g., a partitioning using quad-tree representations), it is desirable that each analysis region becomes confined to the boundaries of its quad-tree representation. That is, for example, it is desirable that features describing a region of an image, and which are used for inferring a mode decision of the region of the image, do not mix pixels from other regions of the image. For example and referring again to FIG. 7, features describing the blocks 70-2 and/or the blocks 702-1, 702-2, 702-3, and 702-4 desirably do not include, in their respective fields, pixels from any of the blocks 700-1, 700-3, or 700-4.

The following four equations can be used to calculate the receptive field in each layer of a CNN.

$$n_{out} = \left\lfloor \frac{n_{in} + 2p - k}{s} \right\rfloor + 1 \qquad (1)$$

$$j_{out} = j_{in} \times s \qquad (2)$$

$$r_{out} = r_{in} + (k-1) \times j_{in} \qquad (3)$$

$$start_{out} = start_{in} + \left(\frac{k-1}{2} - p\right) \times j_{in} \qquad (4)$$

In the above, $n_{out}$ is the number of output features in a layer. In the example 1100, a first layer corresponds to (e.g., includes) the first feature map 1104 and a second layer corresponds to (e.g., includes) the second feature map 1106. Further, $n_{in}$ is the number of input features to the layer. For example, the number of input features to the second layer is the number of features in the first feature map 1104, namely 9. The variables k, p, and s (collectively referred to as the convolution properties) are, respectively, the convolution kernel size, the convolution padding size, and the convolution stride size/value.

Equation (1) calculates the number of output features of a layer based on the number of input features and the convolution properties. Equation (2) calculates a distance (i.e., a jump $j_{out}$) between two adjacent features in the output feature map. Equation (3) calculates the receptive field size (i.e., $r_{out}$) of the output feature map, which is define as the area that is covered by k input features and the extra area that is covered by the receptive field of the input feature that is on the border. Equation (4) calculates the center position (i.e., $start_{out}$) of the receptive field of the first output feature (e.g., the pixel 1108 and the pixel 1110 correspond, respectively, to the first output feature in the first feature map 1104 and the second feature map 1106).

Having described the concept of receptive fields in more detail, characteristics shared by receptive field conforming CNN architectures according to the teachings herein are next described, along with variations.

As mentioned briefly above, the CNN architectures described herein are all-convolutional networks. That is, the feature extraction and the classification layers use convolution operations. In the feature extraction layers, non-overlapping convolution operations are performed on the input at each layer. At least some of the feature extraction layers, the non-overlapping convolution operations are performed by setting the stride value the same as the kernel size. At least some of the kernel sizes can be even numbers (i.e., multiples of 2).

For example, in FIG. 9, each convolution layer in the feature extraction layers uses a 2×2 kernel, with the stride of 2. This non-overlapping convolution operation ensures that, at the last feature extraction layer (i.e., immediately before the concatenation layer 916), each one of the N×N channels (i.e., feature maps of size N×N), where N=8 in the example of FIG. 9, only sees (e.g., uses, is affected by, etc.) information from its corresponding sub-block of size (64/N)× (64/N), where 64×64, in the example of FIG. 9, corresponds to the size of the block 902 (i.e., the input block). In an example, N can be $2^k$.

In the classification layers, instead of fully connected layers, convolution reduction with 1×1 kernels is performed until the number of desired outputs is reached. Convolutional layers are used in the classification layers. As such, the receptive fields are respected (e.g., preserved).

For example, in the CNN 900, in order to infer partition decisions (i.e., by the classifier 918) for sub-blocks of size 16×16 (i.e., as the feature map 925, which is the output of the classifier 918), non-overlapping convolution operations (i.e., between the concatenation layer 916 and the first layer of the classifiers 918) with a kernel size 2 are performed to reduce the number of channels from 8×8 (i.e., the size of each of the feature maps of the concatenation layer 916 as described above) to 4×4 (i.e., the size of each of the feature maps 919), and from then on apply kernel size 1×1 and gradually reduce the feature dimension size to 1 (i.e., the feature map 925, which is of size 4×4×1). The output of the last classification layer is 4×4×1, which is the partition determination of the 16 sub-blocks of the input 902. Each of the 16 sub-blocks is of size 16×16 pixels.

Similarly, the partition decision for each of the 32×32 sub-blocks can be inferred by the classifiers 920; and the partition of the 64×64 block can be inferred by the classifiers 922.

As a person skilled in the art recognizes, a kernel of size 1×1 can be used to reduce the dimensionality of feature maps. For example, an input of size 4×4×32 (32 features maps, each of size 4×4), when convolved with one filter of size 1×1 would result in a feature map of size of 4×4×1. As such, a kernel of size 1×1 can be used to pool (e.g., combine) information from multiple feature maps. Further, a kernel of size 1×1, as used herein, does not mix values from different locations of the input. That is, continuing with the example above, when determining the value at location (x, y) of the feature map of size 4×4×1, only the 32 values at the location (x, y) of the each of the 32 maps of the feature maps of size 4×4×32 are used. As such, by using 1×1 convolutions, the receptive fields can be preserved (e.g., respected).

The inventive CNN architectures described herein include the combination of using non-overlapping kernel sizes with an all-convolutional network (for feature extraction and for classification) that respects receptive fields. This combination allows for a flexible CNN architecture of reduced size over using fully connected layers for classification. Further, the CNN architectures described herein can improve inferences over alternative structures.

As mentioned, the CNN architecture described herein is flexible in that the number of layers, the number of feature extraction branches, and the number of features used in each layer are all configurable. This allows for deployment flexibility of the model architecture for different application constraints. For example, a larger model such as the model of FIG. 9, can be used for applications with higher accuracy requirements and lower power/hardware footprint constraint. A smaller model, such as the examples described below in regards to FIGS. 12-15, can be used when accuracy is less important and/or a higher power/hardware footprint constraint exists. Whether using a relatively small or a relatively large model, a concatenation layer, such as the concatenation layer 916, is optional.

Figure 12:
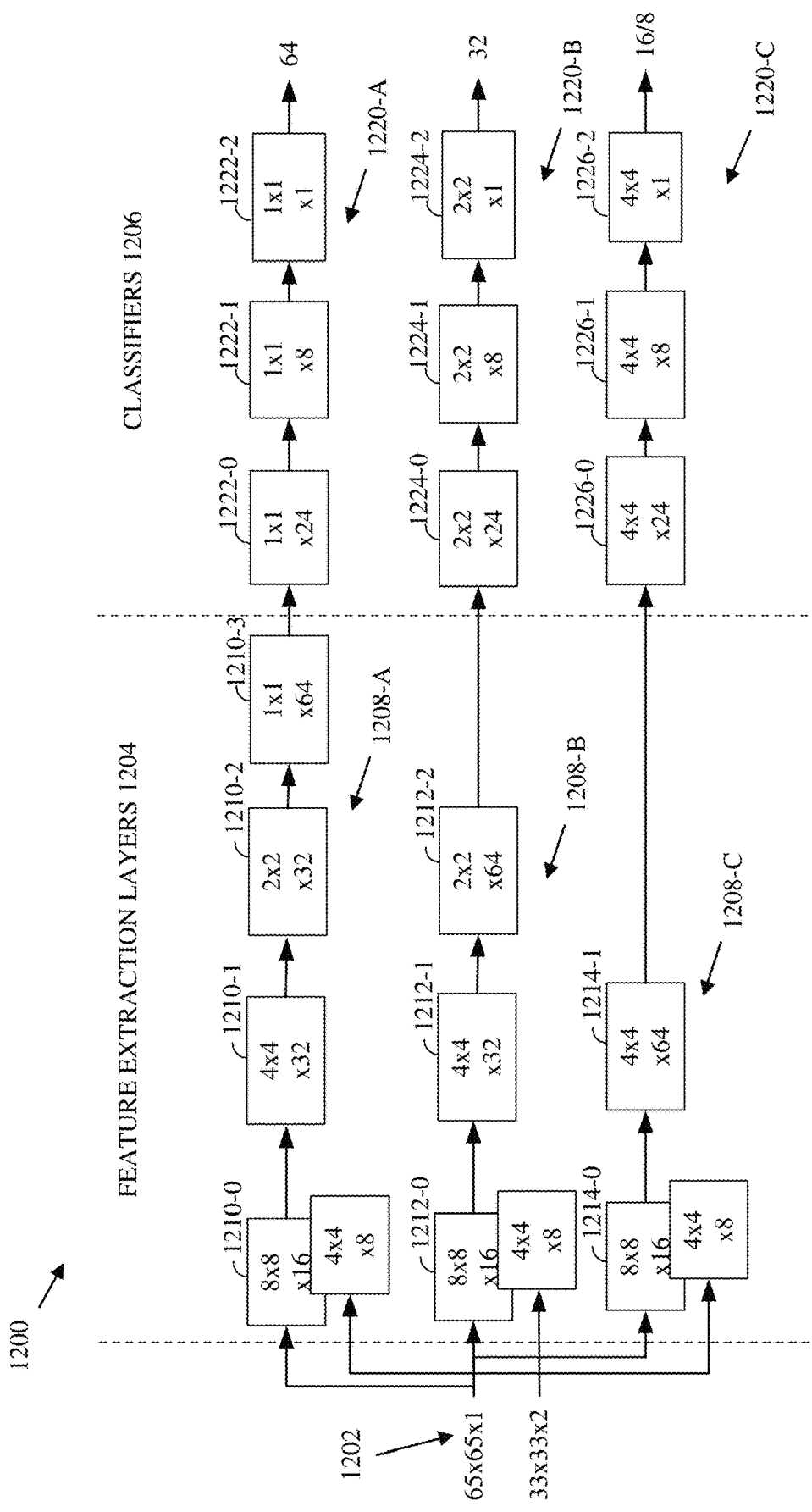
FIG. 12 is a block diagram of a second example of a CNN for a mode decision according to implementations of this disclosure.

FIG. 12 is a block diagram of a second example of a CNN 1200 for a mode decision according to implementations of this disclosure. Like the CNN 900, the CNN 1200 includes inputs 1202, feature extraction layers 1204, and classifiers

1206. Among other differences, the CNN 1200 of FIG. 12 has fewer feature extraction layers, fewer classification layers in the classifiers, and fewer number of features in each layer than the CNN 900.

In general, for a CNN herein, where an input has a size 64×64×1, partition decisions for 16×16 sub-blocks (i.e., a feature map of size 4×4×1 at the output) means that the multiplication of the kernels/strides can be at most 16. Partition decisions for 32×32 sub-blocks (i.e., a feature map of size 2×2×1 at the output) means that the multiplication of the kernels/strides can be at most 32. Finally, partition decisions for the 64×64 block (i.e., a feature map of size 1×1×1 at the output) means that the multiplication of the kernels/strides can be at most 64. This general principle in a receptive field conformant CNN can be seen with reference to FIG. 9. Namely, given the input 902, where the end is the feature map 925, the feature map 927, or the feature map 929, the multiplication where the kernel size equals the stride value has at most 64/4, 64/2, or 64/1, or respectively 16, 32, or 64 for partitions of 16×16, 32×32, or 64×64. Similar determinations may be used for partitioning 128× 128, 8×8, or 4×4, for example, using 128×128, 8×8, or 4×4 inputs.

This general principle may also be applied where, like in FIG. 12, the inputs 1202 include a (e.g., luma) input block having a size 65×65×1, and the output comprises partition decisions for 16×16 sub-blocks (i.e., a feature map of size 4×4×1 at the output), partition decisions for 32×32 sub-blocks (i.e., a feature map of size 2×2×1 at the output), and partition decisions for the 64×64 block (i.e., a feature map of size 1×1×1 at the output). As described above with regard to FIG. 9, if a partitioning of a 64×64 block is to be determined, then a block of size 65×65×1 can be used as input to the CNN 1200. That is, for example, the (e.g., left and top) neighboring pixels of the block for which a partitioning is to determined can be included in the input block to the CNN 1200. In such a case, and in order to preserve the receptive field property as described above, a first filter (e.g., a first filter in each branch of the feature extraction layers) can be of size $2^k+1$ and the stride can be $2^k$. Stated more specifically, the multiplication of the kernels/strides as shown in FIG. 12 (and in the variations described below) is such that the initial feature extraction layer 1210-0, 1212-0, 1214-0 in each branch 1208-A, 1208-B, 1208-C of the feature classification layers 1204 has a kernel size of $2^k+1$ and a stride value of $2^k$. Successive layers have kernel sizes equal to stride values such that $64/(2^k*\text{product of remaining strides})=4, 2,$ or $1$. The same determinations may be used for partitioning 128×128, 8×8, or 4×4 blocks, for example, using 129×129, 9×9, or 5×5 inputs.

FIG. 12 shows that an image block to be encoded is presented as inputs 1202 to the CNN 1200. The image block can be a one color-plane block, such as the luminance block 65×65×1. While a superblock of size 64×64 is used to describe the CNN 1200, the block can be of any size.

The feature extraction layers 1204 form three branches 1208-A, 1208-B, 1208-C. The number of branches in the feature extraction layer can be configurable to include more or fewer branches. Each of the branches can include one or more of the feature extraction layers 1204. At each layer, respective feature maps is extracted. In this example, the feature extraction layers comprise a number of branches equal to a number or cardinality of possible quad-tree partition decisions for the block, but this is not required. In any event, each of the branches comprises at least one of the feature extraction layers.

The branch 1208-A extracts, in a first or initial layer 1210-0 of the branch 1208-A, features corresponding to 8×8 blocks of the block. The branch 1208-A convolves k filters with the block, each having a size 8×8. A stride that is equal to $2^k+1$ is used. As a result, 16 feature maps, each of size 8×8, are extracted. The same convolution operation is performed at each first layer 1212-0, 1214-0 of the branches 1208-B, 1208-C.

At a second layer 1210-1 of the branch 1208-A, each of the 16 feature maps of the initial layer 1210-0 is convolved using filters having a size equal to a stride value to extract 32 feature maps, each of size 4×4. At a third layer 1210-2 of the branch 1208-A, each of the 32 feature maps of the second layer 1210-1 is convolved using filters having a size equal to a stride value to extract 32 feature maps, each of size 2×2. Finally, at a fourth layer 1210-3 of the branch 1208-A, each of the 32 feature maps of the third layer 1210-2 is convolved using filters having a size equal to a stride value to extract 64 feature maps, each of size 1×1.

At a second layer 1212-1 of the branch 1208-B, each of the 16 feature maps of the initial layer 1212-0 is convolved using filters having a size equal to a stride value to extract 32 feature maps, each of size 4×4. At a third layer 1212-2 of the branch 1208-B, each of the 32 feature maps of the second layer 1212-1 is convolved using filters having a size equal to a stride value to extract 64 feature maps, each of size 2×2.

At a second layer 1214-1 of the branch 1208-C, each of the 16 feature maps of the initial layer 1214-0 is convolved using filters having a size equal to a stride value to extract 64 feature maps, each of size 4×4.

The CNN 1200 includes three classifiers, namely classifiers 1220-A, 1220-B, and 1220-C. Each of the classifiers 1220-A, 1220-B, 1220-C includes one or more classification layers and uses convolutions as further described below. In this example, the multiple classifiers comprise a respective classifier corresponding to a respective branch of the branches of the feature extraction layers. The feature maps received by the initial classification layer of a respective classifier 1220-A, 1220-B, and 1220-C may be configured to infer the partition decisions for sub-blocks of size $(\alpha S)\times(\alpha S)$ of the block comprising a convolution of N feature maps having respective feature dimension $(N/2^\beta)\times(N/2^\beta)$, wherein $\beta$ is an integer and $\beta 0, \ldots,$ (the number of branches−1).

In the example of FIG. 12, each of the final layers of the feature extraction layers 1204 before the classifiers 1206, namely the fourth layer 1210-3 of the first branch 1208-A, the third layer 1212-1 of the second branch 1208-B, and the second layer 1214-1 of the third branch, include N feature maps. The dimension of the N feature maps in each branch is equal to the number of possible mode decisions (e.g., the quad-tree partitions) for the block size associated with the corresponding classifier of the classifiers 1206. That is, the classifier 1220-A receives 64 feature maps of size 1×1 from the layer 1210-3, and the classifier 1220-A infers (i.e., outputs) one partition decision for the 64×64 input block. The classifier 1220-B receives 64 feature maps of size 2×2 from the layer 1212-2, and the classifier 1220-B infers four partition decisions, one for each of the 32×32 sub-blocks. The classifier 1220-C receives 64 feature maps of size 4×4 from the layer 1214-1, and the classifier 1220-C infers sixteen partition decisions, one for each of the 16×16 sub-blocks. The decisions can be binary decisions. That is, the feature maps output from each of the classifiers 1220-A, 1220-B, 1220-C can be thought of as a matrix of binary decisions. For example, a zero (0) can correspond to a decision not to split a sub-block and a one (1) can correspond to a decision to split the sub-block. The order of the output of a classifier can correspond to a raster scan order of the sub-blocks of the input block. In another example, the decisions can correspond to probabilities (i.e., values that range from 0 to 1), or some other values, such as values that range from 0 to 100. When a decision is greater than a threshold that is appropriate for the range of the decision values (e.g., 0.9, 0.75%, 90, etc.), it can be considered to correspond to a binary decision of 1.

At the classifier 1220-A, a series of convolutions, at least one of which is a 1×1 convolution, is applied, successively, to gradually reduce the feature dimension size to 1. At the first or initial classification layer 1222-0 of the classifier 1220-A, convolutions are applied to the 64 feature maps from the extraction layer 1210-3, resulting in 1×1×24 feature maps, to which convolutions are applied at the second classification layer 1222-1 of the classifier 1220-A, resulting in 1×1×8 feature maps, to which convolutions are applied at the third classification layer 1222-2 of the classifier 1220-A, resulting in a final 1×1×1 feature map.

At the classifier 1220-B, a series of convolutions, at least one of which is a 1×1 convolution, is applied, successively, to gradually reduce the feature dimension size to 1. At the first or initial classification layer 1224-0 of the classifier 1220-B, convolutions are applied to the 64 feature maps from the extraction layer 1212-2, resulting in 2×2×24 feature maps, to which convolutions are applied at the second classification layer 1224-1 of the classifier 1220-B, resulting in 2×2×8 feature maps, to which convolutions are applied at the third classification layer 1224-2 of the classifier 1220-B, resulting in a final 2×2×1 feature map.

At the classifier 1220-C, a series of convolutions, at least one of which is a 1×1 convolution, is applied, successively, to gradually reduce the feature dimension size to 1. At the first or initial classification layer 1226-0 of the classifier 1220-C, convolutions are applied to the 64 feature maps from the extraction layer 1212-2, resulting in 4×4×24 feature maps, to which convolutions are applied at the second classification layer 1226-1 of the classifier 1220-C, resulting in 4×4×8 feature maps, to which convolutions are applied at the third classification layer 1226-2 of the classifier 1220-C, resulting in a final 4×4×1 feature map.

In each of the classifiers 1206, (e.g., non-overlapping) convolutional filters of any size can be used as long the classifiers 1206 determine, as described, 4×4 16×16 partitions, 2×2 32×32 partitions, and 1×1 64×64 partition.

Although not expressly shown in FIG. 12, a QP may be used as input to one or more of the feature extraction layers 1204 of the CNN 1200. The QP can be input as a non-linear function f(QP). For example, the input function can be $QP^2$ or $QP^n$. The variable n may be a real number. The variable n may be a non-zero (e.g., positive) integer with an absolute value greater than 1.

FIG. 12 shows a CNN 1200 where inputs 1202 extend from luminance-only (luma) data of the block to luma and chrominance (chroma) data of the block. For example, where the luma input has dimensions of 64×64, two chroma channels with a half resolution in each channel can be included with the inputs. The chroma channels may input in dimensions 32×32×2 in an arrangement such as that in FIG. 9. In this case, the first kernel size may equal the stride value. In FIG. 12, the chroma data is included in the inputs 1202 with dimensions of 33×33×2 by including the neighboring pixels (one row and one column in this example). In this example, the first kernel is $2^k+1$ with a stride value of $2^k$ as described with respect to the luma channel. In either implementation, the kernel and stride relationships are those described in regards to the luma channel to obtain 16-4×4 partitions, except that the multiplication of kernels/strides can be at most 8 because 32/4 is equal to 8.

More specifically, and referring to FIG. 12, the branch 1208-A extracts, in a second kernel of the initial layer 1210-0, features corresponding to 4×4 blocks of the chroma blocks. The branch 1208-A convolves k filters with the chroma blocks, each having a size 4×4. A stride that is equal to $2^k+1$ is used. As a result, 8 feature maps, each of size 4×4, are extracted. The same convolution operation is performed at each first layer 1212-0, 1214-0 of the branches 1208-B, 1208-C. Then, each of the 8 feature maps having the size 4×4 is convolved with the feature maps corresponding to the luma block for the additional feature extraction layers 1204.

The inclusion of chroma data is optional but may improve the inference performance of a CNN over using luma data alone. For example, in some videos, content may not be well captured in the luma channel. By including the additional data in chroma channels, additional features are available for feature extraction, such as in the feature extraction layers 1204, improving inference accuracy at the classifiers, such as the classifiers 1206.

Although FIG. 12 and its variations refer to luminance and chrominance data in the YUV color space, the CNN architectures described herein may be used with other color spaces, such as RGB or LUV, for example.

In these implementations, one column and one row of pixels is used for the (e.g., left and top) neighboring pixels in each of the luma and chroma inputs. In some implementations, more than one row/column represented by the value v may be used. Accordingly, the input would be (64+v)×(64+v)×1 for a 64×64 luma block and (32+v)×(32+v)×2 for the two 32×32 chroma blocks, and the first kernel has a kernel size of $2^k+v$ and a stride value of $2^k$. It is worth noting that these examples of luma and chroma block sizes refer to 4:2:0 format. If another format is used, the relative block sizes between the luma and chroma samples will differ from these examples.

In addition to adjusting the number of features on each convolution layer, the architecture of FIGS. 9 and 12, and their variations described herein can be designed so that a global feature adjustment rate r may be applied across all layers for reducing/expanding the number of features. This feature adjustment rate can be a configurable hyper-parameter. After applying the feature adjustment rate, the number of features can be reduced/expended from n to n*r.

Figure 13:
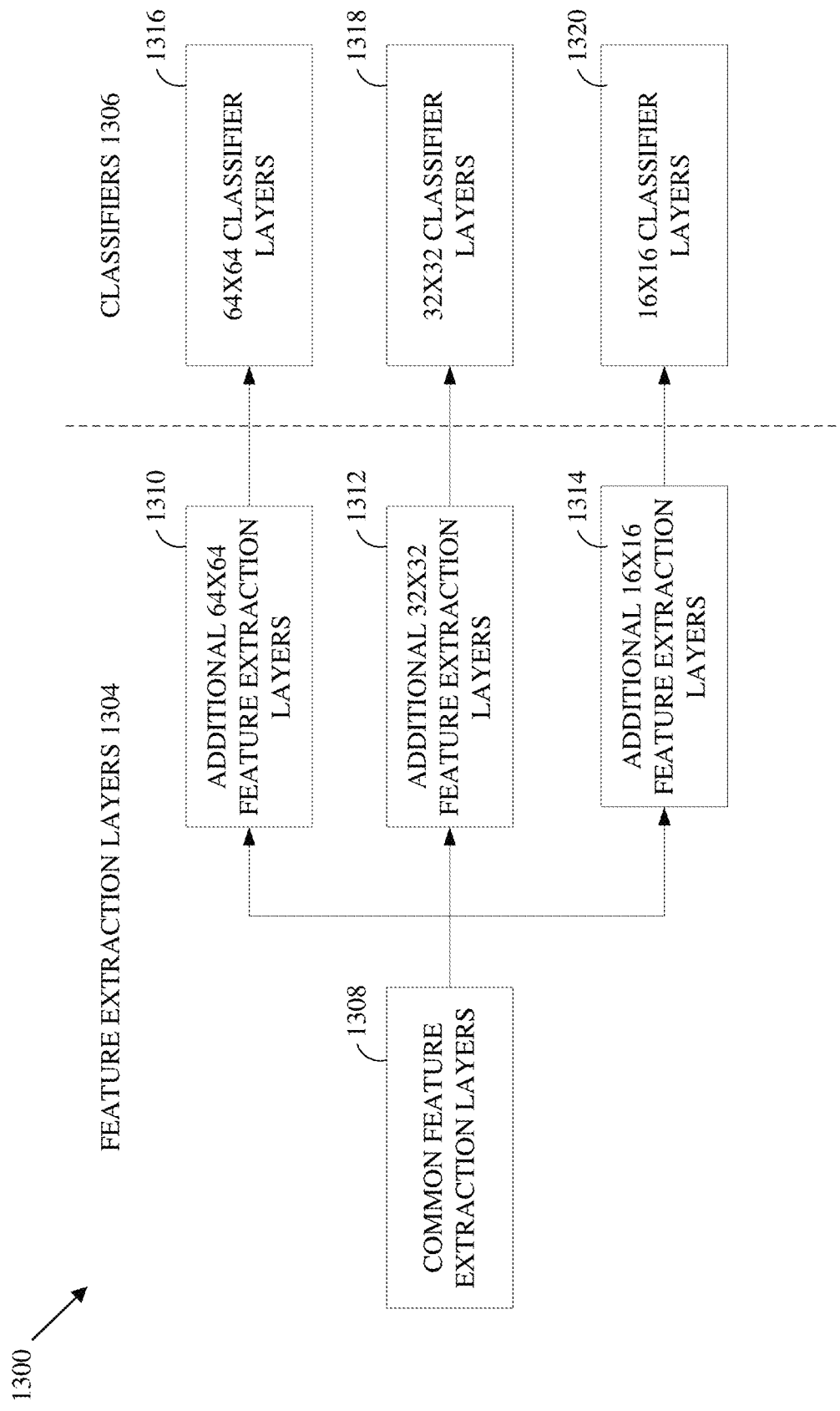
FIG. 13 is a block diagram of a third example of a CNN for a mode decision according to implementations of this disclosure.

The flexible architecture described herein allows different classifiers to have distinct feature extraction as in the CNNs 900, 1200, or share one or more feature extraction layers, such as shown in the example of FIG. 13. FIG. 13 is a block diagram of a third example of a CNN 1300 for a mode decision according to implementations of this disclosure. The CNN 1300 of FIG. 13 includes feature extraction layers 1304 and classifiers 1306. The feature extraction layers 1304 include one or more common feature extraction layers 1308 and additional feature extraction layers 1310, 1312, 1314. Specifically, the common feature extraction layers 1308 provide features maps to teach of additional 64×64 feature extraction layers 1310, additional 32×32 feature extraction layers 1312, and additional 16×16 feature extraction layers 1314. In this way, the common feature extraction layers 1308 are shared by one or more of the classifiers 1306. In the CNN 1300, the common feature extraction layers 1308 are shared by each of the 64×64 classifier layers 1316, the 32×32 classifier layers 1318, and the 16×16 classifier layers 1320. An advantage of not sharing common feature extraction layers is that such a CNN can maximize the inference accuracy through the design of specific extraction layers for each classifier. However, sharing common feature extraction layers between different classifiers has an advantage in that the sharing can effectively reduce model size. Sharing common feature extraction layers may be seen in additional detail in the example of FIG. 14.

Figure 14:
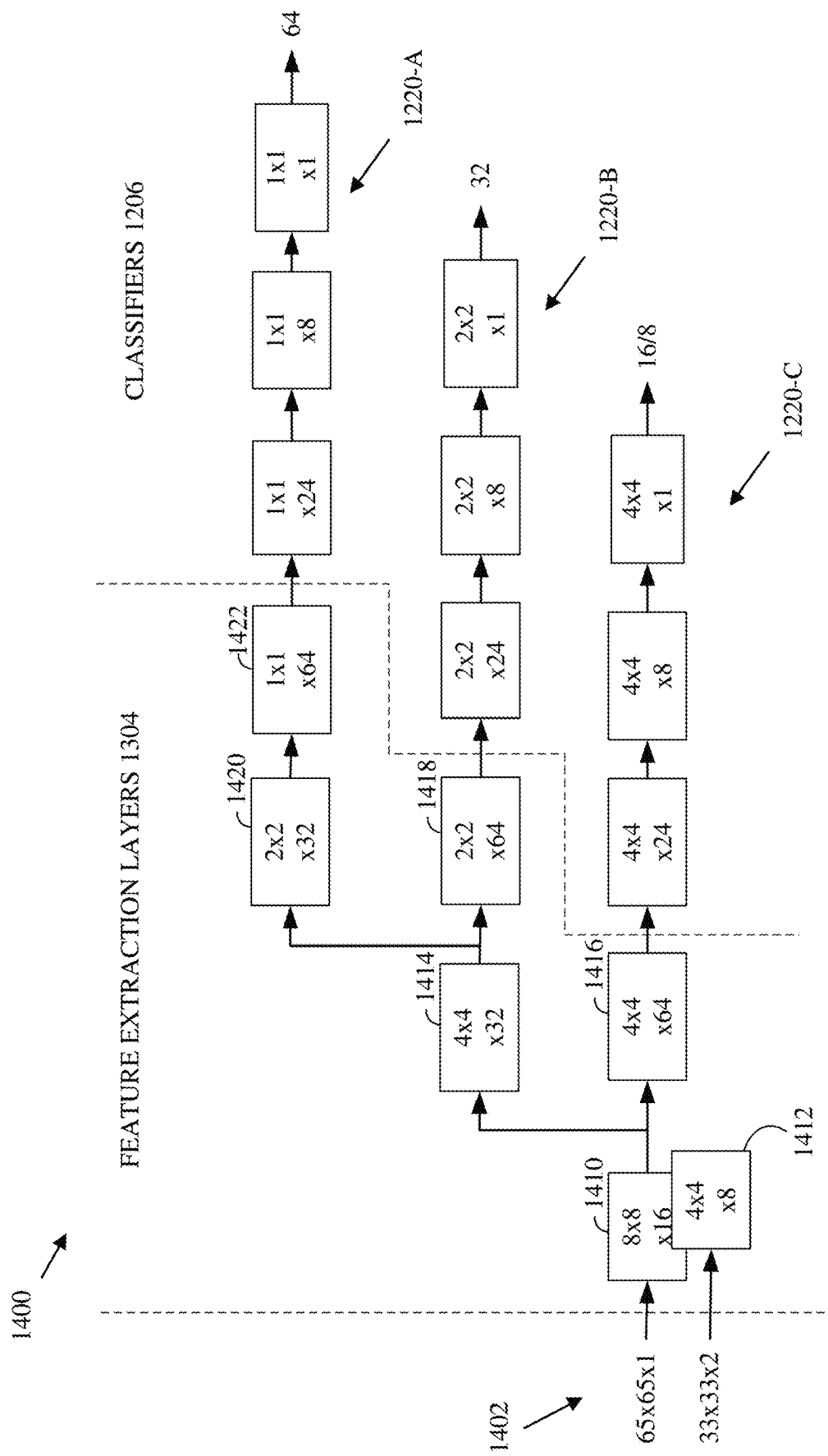
FIG. 14 is a block diagram of a fourth example of a CNN for a mode decision according to implementations of this disclosure.

FIG. 14 is a block diagram of a fourth example of a CNN 1400 for a mode decision according to implementations of this disclosure. The CNN 1400 of FIG. 14 modifies the architecture of the CNN 1200 by forcing the three classifiers 1206 to share some feature extraction layers. The classifiers 1206 (i.e., the layers of the classifiers 1206) in the CNN 1400 are unchanged from those in the CNN 1200 of FIG. 12. The inputs 1402 comprise luma data in the form of input 65×65×1 and chroma data in the form of inputs 33×33×2. Each of the three classifiers 1220-A, 1220-B, 1220-C share first/initial feature extraction layers 1410, 1412 of sizes 8×8×16 and 4×4×8, respectively. Subsequent layers branch therefrom. The classifiers 1220-A, 1220-B for 64×64 and 32×32 blocks, respectively, share a subsequent feature classification layer 1414 having a size 4×4×32. As indicated more generally in FIG. 13, the CNN 1400 also includes additional feature extraction layers that are specific to each of the classifiers 1206. For example, the classifier 1220-C for 16×16 blocks receives input through an additional classification layer 1416 having a size 4×4×32. Similarly, the classifier 1220-B for 32×32 blocks receives input through an additional classification layer 1418 having a size 2×2×64. The classifier 1220-A for 64×64 blocks receives input through two additional classification layers 1420 and 1422, respectively having sizes 2×2×32 and 1×1×64. As mentioned, sharing common feature extraction layers can reduce model size. In addition, sharing common feature extraction layers can increase model robustness to noise.

The mode decision inferred by the CNNs described above for a block (e.g., a superblock) is the block partitioning. However, existing video codecs also use brute force approaches to decide the optimal prediction modes and transform unit sizes for compression of the block. These mode decisions are similar to the mode decision of block partitioning in the sense that they all use features based on the raw image content and a quantization value of the block. Further, the same receptive-field-conforming principle should be observed for the decisions of prediction mode (PM) and transform unit (TU) size and/or type on the block/sub-block level. Accordingly, the teachings herein may be extended to include these mode decisions.

Figure 15:
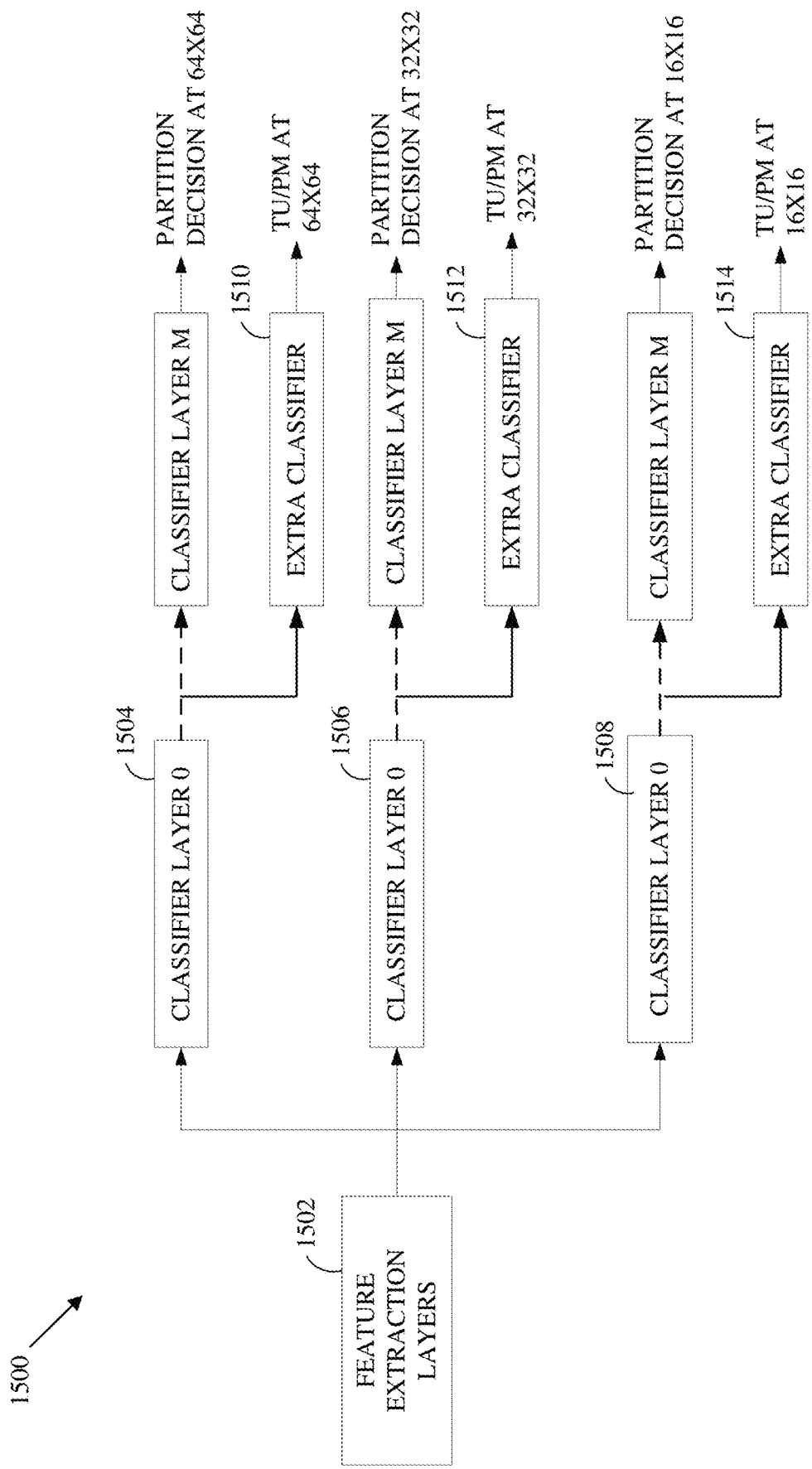
FIG. 15 is a block diagram of a fifth example of a CNN for a mode decision according to implementations of this disclosure.

FIG. 15 is a block diagram of a fifth example of a CNN 1500 for a mode decision according to implementations of this disclosure. The CNN 1500 extends the architecture previously described to infer prediction (e.g., intra prediction) modes and transform unit sizes. As can be seen in FIG. 15, the classifiers for PM and TU at each sub-block size can share common feature extraction layers 1502 with the classifiers for the partition decisions, such as those described with regard to FIGS. 9 and 12. More specifically, the CNN 1500 indicates that the classifiers for each of the partition decisions for 64×64 blocks, 32×32 blocks, and 16×16 blocks comprises separate classifier layers 0 to m, where m is a positive integer. The layers conform to the rules described above with regard to the multiplication of the kernel sizes and stride values, and to the receptive field conformance. In this example, the classifiers for PM and TU at each sub-block size also share the first/initial classification layers 1504, 1506, 1508, respectively with its corresponding block partition classifiers. The initial classification layers 1504, 1506, 1508 provide respective inputs (e.g., feature maps) to an extra classifier for the PM and TU at each sub-block size, respectively classifiers 1510, 1512, 1514. The classifiers 1510, 1512, 1514 may each comprise one or more classifier layers. This arrangement may be desirable because block partitioning and TU/PM determination can use similar image features for inferring decisions. More desirably, mode decisions for TU/PM have their own classification layers to implement classification rules that are unique to those mode decisions.

For simplicity, the CNNs 900, 1200, 1300, 1400, 1500 are described for determining a partitioning of a 64×64 block from a 64×64 partition down to whether each 16×16 sub-block should be further partitioned into 8×8 blocks. However, the disclosure herein is not so limited. A CNN architecture according to implementations of the disclosure can be generalized as follows.

A CNN for determining a mode decision in video coding, where the block is of size N×N (e.g., 64×64, 128×128) and where a smallest partition determined by the CNN is of size S×S (e.g., 4×4, 8×8), can include feature extraction layers, optionally a concatenation layer, and classifiers. The classifiers include all-convolutional layers. Other values of N and S can be possible. In some examples, N can be 32, 64, or 128, and S can be 4, 8, or 16.

When a concatenation layer is included as in the CNN 900, the layer may receive, from the feature extraction layers, feature maps of the block. Each feature map may be of a defined size, such as 8×8.

Whether or not a concatenation layer is included, each of the classifiers includes one or more classification layers. Each classification layer receives feature maps having a respective feature dimension. For example, and referring to FIG. 9, the classifier 918 includes 5 classification layers (illustrated by the 5 squares representing the feature maps of each layer), the classifier 920 includes 4 classification layers, and the classifier 922 includes 3 classification layers. For example, and referring to FIGS. 12 and 14, each of the classifiers 1220-A, 1220-B, 1220-C includes 3 classification layers (illustrated by the 3 squares representing the feature maps of each layer).

Each of the classifiers can be configured to infer a partition decision for sub-blocks of a specific size. That is, a classifier can be configured to infer partition decisions for sub-blocks of size $(\alpha S) \times (\alpha S)$ of the block, where $\alpha$ is a power of 2 and $\alpha=2, \ldots, N/S$. As such, when N=64 and S=8, $\alpha$ can have any of the values 2, 4, and 8. For example, with respect to the classifiers 918, 1220-C, $\alpha=2$ and the classifiers 918, 1220-C infer partition decisions for blocks of size (2×8)×(2×8)=16×16; with respect to the classifiers 920, 1220-B, $\alpha=4$ and the classifiers 920, 1220-B infer partition decisions for blocks of size (4×8)×(4×8)=32×32; and with respect to the classifiers 922, 1220-A, $\alpha=8$ and the classifiers 1022, 1220-A infer partition decisions for blocks of size (8×8)×(8×8)=64×64.

A classifier can infer partition decisions for sub-blocks of size $(\alpha S) \times (\alpha S)$ of the block by instructions that include applying, at each successive classification layer of the classification layers, a kernel of size 1×1 to reduce the respective feature dimension at least in half; and outputting by a last layer of the classification layers an output corresponding to a $N/(\alpha S) \times N/(\alpha S) \times 1$ output map. Using the classifier 922 as an example where $\alpha=8$, the classifier 922 convolves the feature maps 923 with 32 kernels, each of size 1×1, thereby resulting in feature maps 931, which have dimensions of 1×1×32. The feature map 929 (which is of size $N/(\alpha S) \times N/(\alpha S) \times 1 = 64/(8 \times 8) \times 64/(8 \times 8) \times 1 = 1 \times 1 \times 1$) corresponds to the decision whether the block of size N×N should be split or not. As can be seen from FIGS. 12 and 14, a classifier may convolve the feature maps of a previous layer with a different number of kernels to reduce the respective feature dimension by more than half (here, by $2^3$).

In the example of FIG. 9, a first classifier 918, can receive the first feature maps as an output of a final feature extraction layer of the feature extraction layers through the concatenation layer (e.g., the concatenation layer 916), wherein a first non-overlapping convolution operation using a first 2×2 kernel is applied to reduce the first feature maps to a size of (S/2)×(S/2). For example, as described with respect to the classifier 918, the first layer of the classifier 918 receives the 8×8 feature maps from the concatenation layer 916 and reduces them to the size of 4×4 (i.e., the feature maps 919). In the example of the classifier 918, the feature maps 919 is shown as having a dimension of 256. However, that need not be the case so long as the dimension of the last layer of each of the classifiers is N/(αS)×N/(αS)×1 in this example. The CNN may also include a second classifier 922 that infers partition decisions for sub-blocks of size (βS)×(βS). In an example, β=8. The second classifier can receive third feature maps, each of size M×M, from a third classifier. The third classifier can be the classifier 920. As such, M=2 and the third feature maps can be the features maps 921. The second classifier can apply a second non-overlapping convolution operation using a second 2×2 kernel to reduce the third feature maps to a size of (M/2)×(M/2). For example, the classifier 922 receives the features maps 921 from the classifier 920 and applies a second non-overlapping convolution operation using a second 2×2 kernel to generate the feature maps 923.

In contrast, in the CNN 1200 and its variations that do not include a concatenation layer, an initial classification layer of each classifier receives the feature maps as an output of a final feature extraction layer of the feature extraction layers, directly from the final feature extraction layer.

The feature maps received at an initial classification layer include specific feature dimensionalities for illustrative purposes. The number or cardinality of feature maps received at the first layer of each classifier can be configurable. Kernel sizes that obey the rule kernel=stride size=($2^k$, $2^k$), for some k, can be used in some examples.

In a case where v neighboring rows and v neighboring columns are included in input to the first feature extraction layer(s), such that the input block is of size (64+v)×(64×v), (128+v×128+v), etc., a kernel of size ($2^k$+v, $2^k$+v) and a stride size of ($2^k$, $2^k$) can be used to propagate the v left/top information and observe (e.g., preserve) the perception field.

While outputs of the classification layers are described as matrices of the form B×B×1 (e.g., 4×4×1, 2×2×1, or 1×1×1), it is to be understood that a classification layer outputs B*B=$B^2$ values, such that each of the outputs $B^2$ corresponds to a Cartesian location in the matrix. Each of the output values corresponds a block location and can be a value indicating whether a sub-block at that location should be partitioned or not. For example, a value of 0 can indicate that the sub-block is not to be partitioned and a value of 1 can indicate that the sub-block is to be partitioned. Other values are, of course, possible.

The first/initial feature extraction layer can apply a non-overlapping convolution filter to the block to generate feature maps of the block for the next feature extraction layer. Each successive feature extraction layer after the initial feature extraction layer can apply a non-overlapping convolution filter to the feature maps from the previous layer. A non-overlapping convolution operation is performed on input at at least one of the feature extraction layers by setting a stride value equal to a kernel size.

For example, a first feature extraction layer can apply a (N/S)×(N/S) non-overlapping convolution filter to the block to generate a first subset (e.g., cardinality) of the feature maps of the block. This can be illustrated by example where the feature extraction layer 903-A applies a (64/8)×(64/8)=8×8 non-overlapping convolutional filter to the block 902 to generate the feature maps 904. A second feature extraction layer can apply a M×M non-overlapping convolutional filter to the block to generate maps each of size (N/M)×(N/M), where M is less than S, is greater than 1, and is a power of 2; and successively apply non-overlapping 2×2 convolutional filters to the maps to generate a second subset (e.g., cardinality) of the feature maps of the block. The feature extraction layers 903-B and 903-C can be examples of the second feature extraction layer.

As described above, a non-linear value of a quantization parameter (QP) can be used as an input to the CNN. In FIG. 9, the non-linear value of QP is shown as an input to the concatenation layer 916. However, that need not be the case and the non-linear value of the QP can be used as an input to other layers of the CNN. For example, the non-linear value of the QP can be used as the input to at least one of the classification layers.

A CNN that is configured as described above can be used by an encoder, such as the encoder 400 of FIG. 4, to infer mode decisions that include block partitioning and optionally other mode decisions. As such, the mode decisions are not derived by brute force methods as are known in the art. In an example, a CNN described herein can be used by the intra/inter-prediction stage 402. Subsequent to inferring the block partitioning, an encoder can predict the blocks of the partitions using known prediction techniques, such as inter-prediction, intra-prediction, other techniques, or a combination thereof, or can obtain the prediction mode from the CNN. The resulting residual may be encoded as described with regard to FIG. 4, optionally where the transform type/size is also provided by the CNN.

Figure 16:
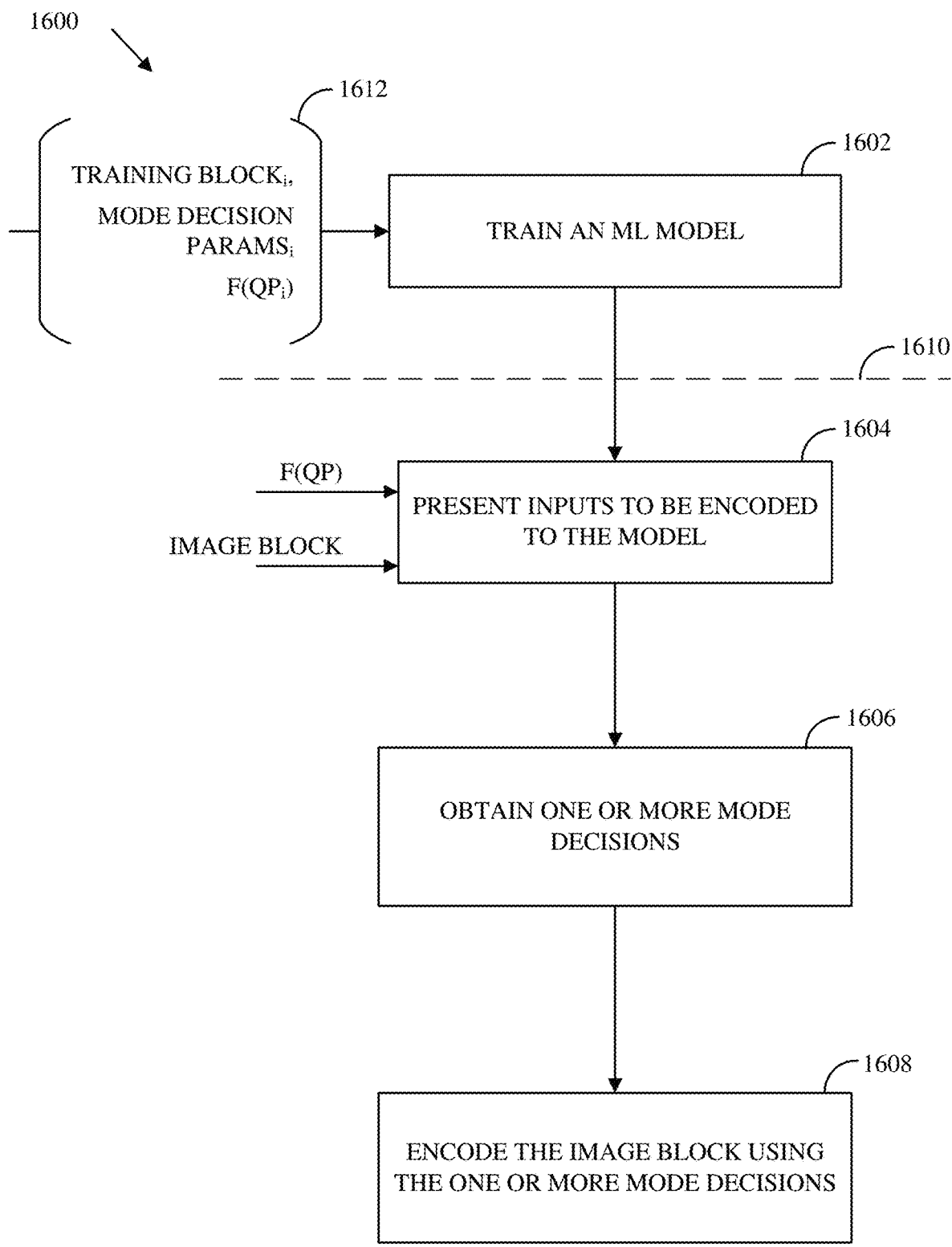
FIG. 16 is a flowchart of a process for encoding, by an encoder, an image block according to implementations of this disclosure.

FIG. 16 is a flowchart of a process 1600 for encoding, by an encoder, an image block according to implementations of this disclosure. The process 1600 trains, using input data, a machine-learning model to infer one or more mode decisions. The process 1600 then uses the trained machine-learning model to infer a mode decision for an image block, which is to be encoded. In an example, the mode decision can be a quad-tree partition decision of the image block. The image block can be a block of an image (e.g., a video frame) that is encoded using intra-prediction. In another example, the mode decision can be a partition that includes partitions described with respect to FIG. 17 described below. As further described below, some of the partitions of FIG. 17 include square and non-square sub-partition; and each of the square sub-partitions can be further partitioned according to one of the partitions of FIG. 17.

At 1602, the process 1600 trains the machine-learning (ML) model. The ML model can be trained using a training data 1612. Each training datum of the training data 1612 can include a video block that was encoded by traditional encoding methods (e.g., by an encoder such as described with respect to FIGS. 4 and 6-8); a QP used by the encoder; zero or more additional inputs corresponding to inputs used by the encoder in determining the mode decision (e.g., block partitioning and optionally prediction mode and/or transform unit size) for encoding the video block; and the resulting mode decision determined by the encoder. In the training phase, parameters of the ML model are generated such that, for at least some of the training data, the ML model can infer, for a training datum, the resulting mode decision of the training datum for a set of inputs that includes the video block, the value corresponding to a quantization parameter, and zero or more additional inputs of the training datum.

As described above, the value corresponding to the QP has a non-linear relation to the QP. That is, the value is derived from the QP based on a non-linear function of the QP. In an example, the non-linear function can be an exponential function, a quadratic function, or some other non-linear function of the QP. For example, the non-linear function $f(Q)=c^{QP}$, where c is a constant, can be used. In an example, c=1/3. The non-linear function $f(QP)=QP^\alpha$, where is a integer that is not equal to 0 or 1 (i.e., $\alpha \neq 0$ and $\alpha \neq 1$), can be used. In an example, $\alpha=2$. In the general case, the non-linear function is of a same type as a function used by the encoder for determining a multiplier used in a rate-distortion calculation, as described above.

In the case that the ML model is used to infer a relationship between blocks and respective quad-tree partitioning of the blocks, the resulting mode decision determined by the encoder can be indicative of the quad-tree partition of the training block of the training datum. Many indications (e.g., representations) of the quad-tree partition are possible. In an example, a vector (e.g., sequence) of binary flags, as described with respect to the quadtree 704 can be used.

In the case that the ML model is used to infer a relationship between blocks that are intra-predicted and respective partitioning of the blocks, the zero or more additional inputs corresponding to inputs used by the second encoder in determining the mode decision for encoding the video block can include at least some of the samples (i.e., first samples) of the top neighboring block, at least some of the samples (i.e., second samples) of the left neighboring block of the input block, at least some of the samples of the top-left neighboring block, or a combination thereof. For brevity, and without loss of generality, the top-left neighboring block can be considered to be part of either the top neighboring block or the left neighboring block. As such, in an example, the first samples or the second samples can be considered to include samples from the top-left neighboring block.

During the training phase (i.e., at 1602), the ML model learns (e.g., trains, builds, derives, etc.) a mapping (i.e., a function) that accepts, as input, a block and a non-linear value of a quantization parameter (e.g., $QP^2$ as shown in FIG. 9) and outputs at least a partitioning of the block.

During the training phase, and so that the learned function can be as useful as possible, it is preferable that the ML model be trained using a large range of input blocks and a large range of possible QP values, such as QP values that are used in representative of real-world applications.

With respect to input blocks, if the training data set includes only dark (e.g., pixels having low intensity values) training blocks, then the ML model may well learn how to determine a mode decision for dark blocks but provide unreliable output when presented with non-dark blocks during the inference phase. If the encoder uses a discrete set of the QP values, then it is preferable that each of the QP values is well represented in the training data set. For example, if the QP value can vary from 0 to 1, then it is preferable that the training data include varying QP values in the range 0 to 1. If a QP value is not used (e.g., missed QP value) in the training data, then the ML model may misbehave (e.g., provide erroneous output) when the missed QP value is presented to the ML model during the inference phase. In another example, if a missed QP value (i.e., a QP value that is not used during the training phase) is used during the inference phase, the missed QP can be interpolated from QP values that are used during the training phase and the interpolated QP value can then be used during the inference phase.

The ML model can then be used by the process 1600 during an inference phase. The inference phase includes the operations 1604 and 1606. A separation 1610 indicates that the training phase and the inference phase can be separated in time. As such, the inferencing phase can be performed by a first encoder and the training data 1612 can be generated by a second encoder. In an example, the first encoder and the second encoder are the same encoder. That is, the training data 1612 can be generated by the same encoder that performs the inference phase. In either case, the inference phase uses a machine-learning model that is trained as described with respect to 1602.

At 1604, inputs are presented to ML module. That is, the inputs are presented to a module that incorporates, includes, executes, implements, and the like the ML model. The inputs include the image block and optionally a non-linear function of a value corresponding to a QP. As described above, the first value is derived (i.e., results) from the non-linear function using the QP as input to the non-linear function. The inputs can also include additional inputs, as described above with respect to the zero or more additional inputs.

At 1606, the process 1600 obtains one or more mode decisions from the machine-learning model. In an example, the process 1600 obtains the mode decisions as described with respect to FIGS. 9 and 12-15. That is, for example, the CNN can provide an output that is indicative of a quad-tree partition of an image block.

At 1608, the process 1600 encodes the image block using the one or more mode decisions. That is, and continuing with the example of inferring a block partitioning, for each of the sub-blocks (i.e., according to the output that is indicative of a quad-tree partition), the process 1700 can intra-predict (or inter-predict) the block as described with respect to the intra/inter-prediction stage 402 of FIG. 4, and consistent with the description of FIG. 4, ultimately entropy encode, as described with respect to the entropy encoding stage 408, the image block in a compressed bitstream, such as the bitstream 420 of FIG. 4.

An encoder that uses a machine-learning model, such as one of the ML models described herein, to infer mode decision parameters for image block, can encode the mode decisions in a compressed bitstream, such as the bitstream 420 of FIG. 4. As mentioned above, the image block can be a superblock and the mode decision can be indicative of a quad-tree partition of the superblock.

As such, a decoder, such as the decoder 500 of FIG. 5, can decode the image block using the mode decisions received in the compressed bitstream. The process of decoding an image block can include receiving, in a compressed bitstream, such as the compressed bitstream 420 of FIG. 5, an indication of a partitioning of the image block into sub-blocks; and decoding the image block using the indication of the partitioning and optionally the prediction mode and transform unit size (or type) of the image block.

As is known in the art, a quad-tree, such as described with respect to FIG. 7, can be output in a compressed bitstream, such as the bitstream 420 of FIG. 4. A decoder, such as the decoder 500 of FIG. 5, can decode from the compressed bitstream the quad-tree in the process of decoding a block (i.e., a superblock). The quad-tree can be determined (e.g., inferred) in the encoder using a CNN that is configured as described above and output in the compressed bitstream. As such, a decoder decodes, from the compressed bitstream, the quad-tree, which was inferred by the CNN that is configured as described with respect to any of FIG. 9, 12, 13, 14, or 15.

Figure 17:
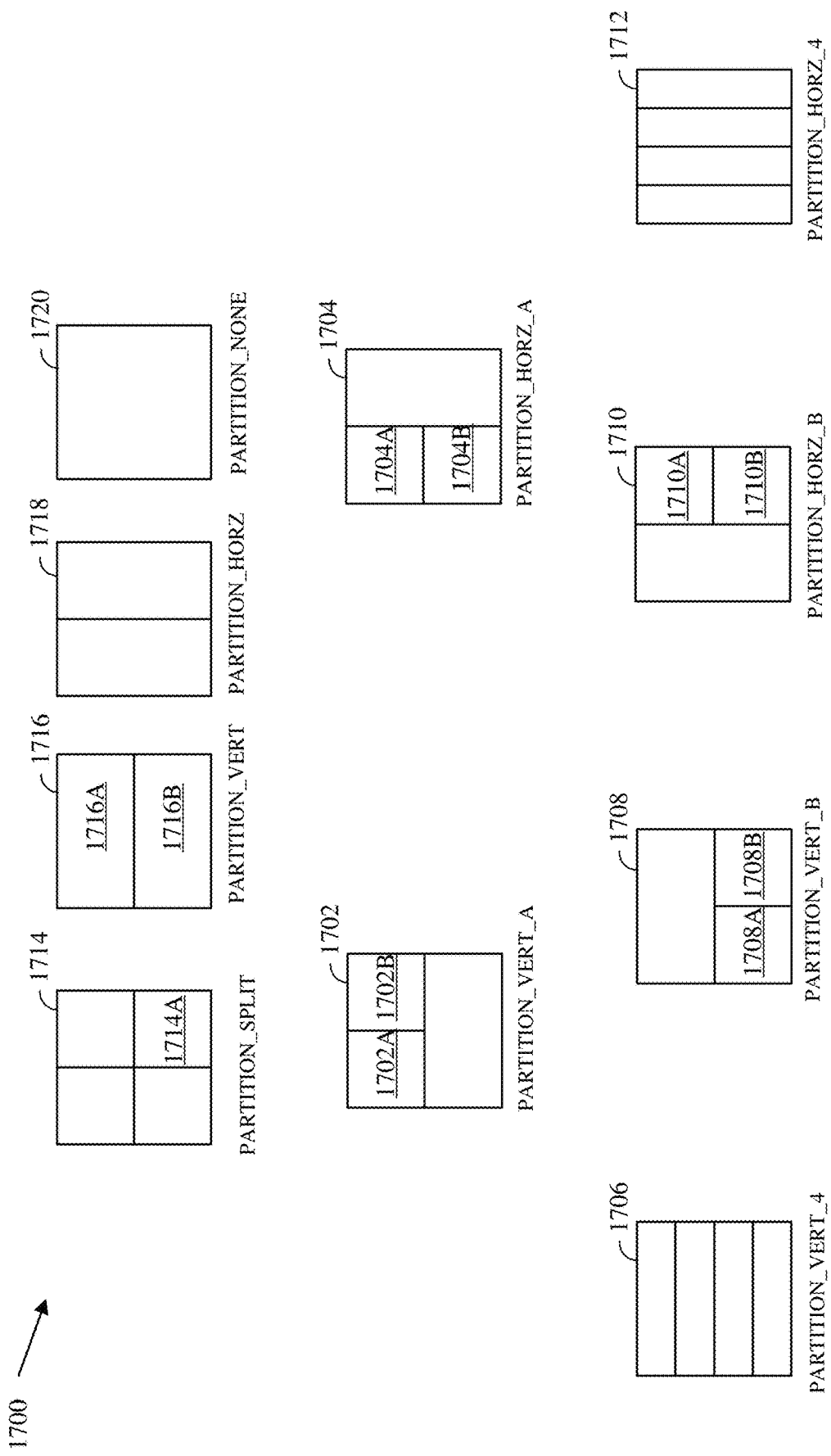
FIG. 17 is an example of non-square partitions of a block.

While inferring a quad-tree partition of a block is described, a CNN according to implementations of this disclosure can be used to infer non-square partitions that may or may not be represented by a quad-tree. That is, for example, a non-square partition can correspond to an internal node of the quad-tree having a number of children that is greater than or equal to two children. FIG. 17 is an example 1700 of non-square partitions of a block. Some encoders may partition a superblock, such as a super-block of size 64×64, 128×128, or any other size, of a square sub-block of the superblock, into one of the partitions of the example 1700.

A partition type 1702 (which may be referred to as the PARTITION_VERT_A) splits an N×N coding block into two horizontally adjacent square blocks, each of size N/2× N/2, and a rectangular prediction unit of size N×N/2. A partition type 1708 (which may be referred to as the PARTITION_VERT_B) splits an N×N coding block into a rectangular prediction unit of size N×N/2 and two horizontally adjacent square blocks, each of size N/2×N/2.

A partition type 1704 (which may be referred to as the PARTITION_HORZ_A) splits an N×N coding block into two vertically adjacent square blocks, each of size N/2×N/2, and a rectangular prediction unit of size N/2×N. A partition type 1710 (which may be referred to as the PARTITION_HORZ_B) splits an N×N coding block into a rectangular prediction unit of size N/2×N and two vertically adjacent square blocks, each of size N/2×N/2.

A partition type 1706 (which may be referred to as the PARTITION_VERT_4) splits an N×N coding block into four vertically adjacent rectangular blocks, each of size N×N/4. A partition type 1712 (which may be referred to as the PARTITION_HORZ_4) splits an N×N coding block into four horizontally adjacent rectangular blocks, each of size N/4×N.

As is known, other partition types can be used by a codec. The example 1700 illustrates four partition types that may be available at an encoder. A partition type 1714 (also referred to herein as the PARTITION_SPLIT partition type and partition-split partition type) splits an N×N coding block into four equally sized square sub-blocks. For example, if the coding block 1714 is of size N×N, then each of the four sub-blocks of the PARTITION_SPLIT partition type, such as a sub-block 1716A, is of size N/4×N/4.

A partition type 1716 (also referred to herein as the PARTITION_VERT partition type) splits the coding block into two adjacent rectangular prediction units, each of size N×N/2. A partition type 1718 (also referred to herein as the PARTITION_HORZ partition type) splits the coding block into two adjacent rectangular prediction units, each of size N/2×N. A partition type 1720 (also referred to herein as the PARTITION_NONE partition type and partition-none partition type) uses one prediction unit for the coding block such that the prediction unit has the same size (i.e., N×N) as the coding block.

The partition types 1714-1720 are referred to herein as basic partition types and the partitions 1702-1712 are referred to herein as extended partition types.

A partition can be represented by a tree. A tree can be represented by a vector. Let P denote the set of all valid partitions (or, equivalently, the respective representations of the partitions). Accordingly, a CNN can be trained to infer a mapping into the set P. Configuring a CNN to infer the partitions described with respect to FIG. 17 includes defining an appropriate set P and using appropriate training data.

Assuming that there are N possible outcomes, then there are N*M possible decisions (in an example, M=21 and N=4) for simplicity, and each p(n, j) can be combined by a softmax function, so that sum(n in range(N)) p(n, j)=1 for some any j.

For example, in the case of VP9, which uses a coding unit size of 64×64 and the four basic partition types, for quad-tree partitions only, there are 21 decisions corresponding to one 64×64, four 32×32, and 16 16×16 decisions (i.e., 1+4+16=21 decisions). In a case where a CNN is used to also determine non-quad-tree partitions, then there are 21*4=84 possible decisions, where 21 corresponds to the quad-tree partitions and four corresponds to the basic partition types; namely, PARTITION_SPLIT, PARTITION_VERT, PARTITION_HORZ, and PARTITION_NONE.

For example, in the case of AV1, which uses a coding unit size of 128×128 and the basic and extended partitions types (for a total of 10 partition types), for quad-tree partitions only, there are 85 decisions (corresponding to one 128×128, four 64×64, 16 32×32, and 64 16×16 decisions) per partition type. In a case where a CNN is used to also determine non-quad-tree partitions, then there are 850 decisions (corresponding to 85 decisions multiplied by 10 partition types=850 decisions).

More generally, non-square partitions can be composed by smaller square groups. Accordingly, the techniques described herein may be generalized to non-square partitions such as shown in FIG. 17.

For simplicity of explanation, the processes depicted and described herein are shown as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A convolutional neural network for determining a mode decision for encoding a block in video coding, comprising: feature extraction layers for extracting features of the block, wherein a non-overlapping convolution operation is performed on input at at least one of the feature extraction layers by setting a stride value equal to a kernel size; and
multiple classifiers for processing the features of the block and outputting the mode decision, wherein:
the mode decision comprises a block partitioning of the block,
the block has a N×N size,
a smallest partition decision for the block has a S×S size,
each classifier comprises classification layers, each classification layer of the classification layers for receiving respective feature maps having a respective feature dimension,
each classifier is configured to infer a partition decision for sub-blocks of size ($\alpha S$)×($\alpha S$) of the block, wherein $\alpha$ is a power of 2 and $\alpha=2, \ldots, N/S$, by:
applying, at some of successive classification layers of the classification layers, a kernel of size 1×1 to reduce the respective feature dimension; and
outputting, by a last layer of the classification layers, an output corresponding to a $N/(\alpha S) \times N/(\alpha S) \times 1$ output map that indicates the partition decision.

2. The convolution neural network of claim 1, wherein an input into an initial feature extraction layer of the feature extraction layers has a size (N+1)×(N+1)×1 comprising the block and neighboring pixels of the block, and a first filter in a branch of the feature extraction layers has a kernel size of $2^k+1$ and a stride value equal to $2^k$, where k is an integer.

3. The convolution neural network of claim 1, wherein a final layer of the feature extraction layers comprises a concatenation layer that receives, from the feature extraction layers, first feature maps of the block, wherein each of the first feature maps is of the S×S size.

4. The convolution neural network of claim 1, wherein the feature extraction layers comprise a number of branches equal to a number of possible quad-tree partition decisions for the block, each of the branches comprising at least one of the feature extraction layers.

5. The convolution neural network of claim 4, wherein the feature extraction layers are arranged so that each of the branches comprises distinct feature extraction layers that do not refer to the feature extraction layers of any other branch of the branches.

6. The convolution neural network of claim 4, wherein the multiple classifiers comprise a respective classifier corresponding to a respective branch of the branches, the feature maps received by an initial classification layer of a respective classifier configured to infer the partition decisions for sub-blocks of size ($\alpha S$)×($\alpha S$) of the block comprising a convolution of N feature maps having respective feature dimension $(N/2^\beta) \times (N/2^\beta)$, wherein $\beta$ is an integer and $\beta=0, \ldots,$ (the number of branches−1).

7. The convolution neural network of claim 1, wherein an initial feature extraction layer of the feature extraction layers comprises a first kernel for performing a first convolution operation using luma data of the block as input and a second kernel for performing a second convolution operation using chroma data of the block as input, the first kernel having a different kernel size from the second kernel, and wherein the block partitioning for the block comprises partitioning of the luma data of the block.

8. The convolution neural network of claim 7, wherein a second filter extraction layer subsequent to the initial feature extraction layer outputs respective feature maps having a single kernel size.

9. The convolution neural network of claim 7, wherein the feature extraction layers are arranged into multiple branches, each branch associated with a respective one of the multiple classifiers, and wherein each of the branches shares at least the initial feature extraction layer.

10. The convolution neural network of claim 1, wherein the mode decision comprises a prediction mode of the block, the multiple classifiers comprise block partition classifiers, and the convolution neural network further comprises multiple prediction mode classifiers, wherein:
  each multiple prediction mode classifier comprises at least one classification layer, each classification layer of the classification layers receiving respective feature maps having a respective feature dimension, and an initial classification layer of each classifier receiving the feature maps as one of the output of the final feature extraction layer of the feature extraction layers or an output of a classification layer of a respective multiple prediction mode classifier.

11. An encoder comprising the convolution neural network of claim 1, wherein the encoder is configured to encode the block using one or more mode decisions indicated by the output of the last layer of the classification layers.

12. A method of determining a mode decision for encoding a block in video coding using a convolutional neural network, comprising:
  extracting, using feature extraction layers of the convolution neural network, features of the block, wherein a non-overlapping convolution operation is performed on input at at least one of the feature extraction layers by setting a stride value equal to a kernel size;
  inferring, by multiple classifiers of the convolution neural network that each include classification layers, the mode decision wherein the mode decision comprises a block partitioning of the block, by:
    receiving, by each classification layer, respective feature maps having a respective feature dimension;
    inferring, by a respective classifier of the multiple classifiers, a partition decision for sub-blocks of size $(\alpha S) \times (\alpha S)$ of the block, wherein the block has a N×N size,
  a smallest partition decision for the block has a S×S size, $\alpha$ is a power of 2, and $\alpha = 2, \ldots, N/S$, by:
    applying, at some of successive classification layers of the classification layers, a kernel of size 1×1 to reduce the respective feature dimension in half; and
    outputting, by a last layer of the classification layers, an output corresponding to a $N/(\alpha S) \times N/(\alpha S) \times 1$ output map that indicates the partition decision.

13. The method of claim 12, wherein extracting the features of the block comprises:
  applying, using a first feature extraction layer, a (N/S)×(N/S) non-overlapping convolutional filter to the block to generate a first cardinality of feature maps of the block.

14. The method of claim 13, wherein extracting the features of the block comprises:
  applying, using a second feature extraction layer, a M×M non-overlapping convolutional filter to an output of the first feature extraction layer to generate a second cardinality of feature maps each of size (N/M)×(N/M), wherein M is less than S, is greater than 1, and is a power of 2.

15. The method of claim 12, further comprising:
  encoding the block using the output from the last layer of the classification layers.

16. The method of claim 12, wherein the feature extraction layers comprise:
  a first branch that provides feature maps to an initial classification layer of a first classifier that infers partition decisions for sub-blocks of size (2S)×(2S);
  a second branch that provides feature maps to an initial classification layer of a second classifier that infers partition decisions for sub-blocks of size (4S)×(4S); and
  a third branch that provides feature maps to an initial classification layer of a third classifier that infers partition decisions for sub-blocks of size (8S)×(8S); and
  wherein the first branch, the second branch, and the third branch share at least one of the feature extraction layers.

17. The method of claim 16, wherein inferring the mode decision comprises:
  applying, at the initial classification layer of the first classifier, a (N/S)×(N/S) non-overlapping convolutional filter to reduce a number of features in the feature maps provided by the first branch;
  applying, at the initial classification layer of the second classifier, a (N/S)×(N/S) non-overlapping convolutional filter to reduce a number of features in the feature maps provided by the second branch; and
  applying, at the initial classification layer of the third classifier, a (N/S)×(N/S) non-overlapping convolutional filter to reduce a number of features in the feature maps provided by the third branch.

18. The method of claim 12, wherein the multiple classifiers comprise multiple partition classifiers, the mode decision comprises a transform size of the block, and inferring the mode decision further comprises:
  inferring, by a respective classifier of multiple transform mode classifiers of the convolution neural network that each include classification layers, transform size decisions for sub-blocks of size $(\alpha S) \times (\alpha S)$ of the block using the feature maps from the final feature extraction layer of the feature extraction layers.

19. An apparatus for decoding an image block, comprising:
  a processor configured to execute a method comprising:
  receiving, in a compressed bitstream, an indication of a partitioning of the image block into sub-blocks, wherein an encoder determined the partitioning of the image block using a convolutional neural network that includes:
    feature extraction layers for extracting features of the block for determining the partitioning, wherein a non-overlapping convolution operation is performed on input at at least one of the feature extraction layers by setting a stride value equal to a kernel size, the block has a N×N size, and a smallest partition output for the block has a S×S size; and
    multiple classifiers, wherein:
      each classifier comprises classification layers, each classification layer of the classification layers receiving respective feature maps having a respective feature dimension, each classifier is configured to infer partition decisions for sub-blocks of size $(\alpha S)\times(\alpha S)$ of the block, wherein $\alpha$ is a power of 2 and $\alpha=2, \ldots, N/S$, by:

applying, at some of successive classification layers of the classification layers, a kernel of size 1×1 to reduce the respective feature dimension; and outputting by a last layer of the classification layers an output corresponding to a $N/(\alpha S)\times N/(\alpha S)\times 1$ output map; and decoding the image block using the indication of the partitioning of the image block.

20. The apparatus of claim 19, where the multiple classifiers share at least one of the feature extraction layers.

* * * * *